US012477241B2

United States Patent
Kim et al.

(10) Patent No.: US 12,477,241 B2
(45) Date of Patent: Nov. 18, 2025

(54) ELECTRONIC DEVICE COMPRISING IMAGE SENSOR AND METHOD OF OPERATING SAME FOR PROCESSING SINGLE AND MULTI-FRAME HIGH DYNAMIC RANGE IMAGES

(71) Applicant: SAMSUNG ELECTRONICS CO., LTD., Suwon-si (KR)

(72) Inventors: Dongsoo Kim, Suwon-si (KR); Hwayong Kang, Suwon-si (KR); Kawang Kang, Suwon-si (KR); Jaehyoung Park, Suwon-si (KR); Byeongjoo Song, Suwon-si (KR); Takafumi Usui, Suwon-si (KR); Jaeoh Jeong, Suwon-si (KR); Hyeoncheol Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 18/195,547

(22) Filed: May 10, 2023

(65) Prior Publication Data

US 2023/0283920 A1    Sep. 7, 2023

Related U.S. Application Data

(63) Continuation of application No. PCT/KR2021/013670, filed on Oct. 6, 2021.

(30) Foreign Application Priority Data

Nov. 11, 2020  (KR) .......................... 10-2020-0150389

(51) Int. Cl.
H04N 25/59        (2023.01)
(52) U.S. Cl.
CPC ................................... H04N 25/59 (2023.01)

(58) Field of Classification Search
CPC ...... H04N 25/53; H04N 25/587; H04N 25/59; H04N 25/616; H04N 25/618
See application file for complete search history.

(56) References Cited

U.S. PATENT DOCUMENTS

| 9,363,450 B2 | 6/2016 | Nakamura et al. |
| 9,774,347 B2 | 9/2017 | Chae et al. |

(Continued)

FOREIGN PATENT DOCUMENTS

| JP | 2012120158 A | * | 6/2012 | ........... G06F 13/385 |
| JP | 2019-68318 A |   | 4/2019 | |

(Continued)

OTHER PUBLICATIONS

International Search Report (PCT/ISA/210) issued by the International Searching Authority on Jan. 20, 2022 in corresponding International Application No. PCT/KR2021/013670.

(Continued)

*Primary Examiner* — Antoinette T Spinks
(74) *Attorney, Agent, or Firm* — Sughrue Mion, PLLC

(57) ABSTRACT

An electronic device including an image sensor and a processor may be provided. The image sensor may provide, in a first mode, to the at least one processor, first image data may be obtained by outputting data input to a unit pixel of the image sensor with a first conversion gain, the first image data may have a first number of bits. The image sensor may provide, in a second mode, to the at least one processor, second image data may be obtained by outputting data input to the unit pixel of the image sensor with the first conversion gain and a second conversion gain. The second conversion gain may be lower than the first conversion gain. The second image data may have a second number of bits which may be larger than the first number of bits.

16 Claims, 15 Drawing Sheets

(56) References Cited

U.S. PATENT DOCUMENTS

| | | |
|---|---|---|
| 9,854,186 B2 | 12/2017 | Johnson et al. |
| 9,888,191 B2 | 2/2018 | Beck |
| 10,129,487 B2 | 11/2018 | Ayers et al. |
| 10,192,297 B2 | 1/2019 | Budagavi et al. |
| 2011/0242385 A1 | 10/2011 | Nishihara |
| 2012/0092533 A1 | 4/2012 | Komori |
| 2012/0120289 A1* | 5/2012 | Sugioka ............ G06T 1/0007 348/294 |
| 2013/0147979 A1* | 6/2013 | McMahon ............ H04N 25/44 348/218.1 |
| 2015/0201140 A1 | 7/2015 | Solhusvik et al. |
| 2015/0222831 A1 | 8/2015 | Hashimoto et al. |
| 2016/0057332 A1* | 2/2016 | Ciurea ................ H04N 5/265 348/218.1 |
| 2016/0145646 A1 | 5/2016 | Frendewey et al. |
| 2016/0366358 A1 | 12/2016 | Shin et al. |
| 2019/0104264 A1 | 4/2019 | Totsuka |
| 2020/0029043 A1 | 1/2020 | McMahon |
| 2020/0322559 A1 | 10/2020 | Shim et al. |
| 2020/0382728 A1 | 12/2020 | Diasparra et al. |
| 2023/0283920 A1* | 9/2023 | Kim ...................... H04N 25/53 348/229.1 |

FOREIGN PATENT DOCUMENTS

| | | |
|---|---|---|
| KR | 10-2016-0145217 A | 12/2016 |
| KR | 10-2020-0096949 A | 8/2020 |
| KR | 10-2020-0117729 A | 10/2020 |

OTHER PUBLICATIONS

Written Opinion (PCT/ISA/237) issued by the International Searching Authority on Jan. 20, 2022 in corresponding International Application No. PCT/KR2021/013670.

* cited by examiner

ELECTRONIC DEVICE COMPRISING IMAGE SENSOR AND METHOD OF OPERATING SAME FOR PROCESSING SINGLE AND MULTI-FRAME HIGH DYNAMIC RANGE IMAGES

CROSS-REFERENCES TO RELATED APPLICATIONS

This application is a bypass continuation of International Application No. PCT/KR2021/013670, filed in the Korean Intellectual Property Office on Oct. 6, 2021, which claims priority from Korean Patent Application No. 10-2020-0150389, filed in the Korean Intellectual Property Office on Nov. 11, 2020, the disclosures of which are incorporated by reference herein in their entireties.

BACKGROUND

1. Field

The present disclosure relates to an electronic device including an image sensor and a method of operating the same and, more particularly, to a technology in which an image sensor outputs data according to switching of the photographing mode.

2. Description of Related Art

The dynamic range (DR) of a digital image is defined as the ratio of the brightest pixel value to the darkest pixel value in the image. The human visual perception system may cover a higher DR than that of a typical digital camera or monitor. Therefore, it may be difficult for electronic devices to obtain or express images in a manner in which humans perceive the same.

An image having a DR greater than a DR capable of being processed by an electronic device is referred to as a high dynamic range (HDR) image. The HDR image may have a wider DR than that of an image obtained by a general digital camera.

HDR image production technology is a multi-frame high dynamic range (MF HDR) technology in which a plurality of images corresponding to different exposure times is obtained and synthesized to expand the DR. An HDR image may be synthesized based on a short-exposure image for a bright area and a long-exposure image for a dark area. For example, even when there is a large difference in brightness between areas in a single image, an image with a large DR may be obtained by synthesizing images having different exposure times.

According to the MF HDR technology, if a subject moves while a plurality of images corresponding to different exposure times is obtained, the long-exposure image and the short-exposure image may not be identical, so that artifacts may appear in the produced HDR image. For example, a ghost effect may occur in which images of a moving subject overlap each other.

According to various embodiments of the present disclosure, it is possible to control a method of outputting (e.g., reading out) data from an image sensor according to switching of a photographing mode of an electronic device. For example, it is possible to prevent image defects from occurring by processing of data transmitted from an image sensor to a processor at a low and/or high luminance.

The technical problem to be solved in the present disclosure are not limited to the technical problem mentioned herein, and other technical problems not mentioned may be clearly understood by those skilled in the art to which the present disclosure pertains from the description below.

SUMMARY

An electronic device according to an embodiment may include an image sensor and at least one processor. The image sensor may provide first image data having a first number of bits to the at least one processor, wherein the image sensor is in a first mode, and wherein the first image data is obtained by outputting data input to a unit pixel of the image sensor at a first conversion gain, and provide second image data having a second number of bits to the at least one processor, wherein the image sensor is in a second mode, wherein the second number is larger than the first number, and wherein the second image data is obtained by outputting the data input to the unit pixel of the image sensor at the first conversion gain and a second conversion gain lower than the first conversion gain.

A method of operating an electronic device according to an embodiment may include, by an image sensor included in the electronic device, obtaining, when the image sensor is in a first mode, first image data having a first number of bits by outputting data input to a unit pixel of the image sensor at a first conversion gain; obtaining, when the image sensor is in a second made, second image data having a second number of bits by outputting the data input to the unit pixel of the image sensor at the first conversion gain and a second conversion gain, the second number of bits being larger than the first number of bits, and the second conversion gain is lower than the first conversion gain; and providing the first image data and the second image data to at least one processor included in the electronic device.

An electronic device according to an embodiment may include an image sensor and at least one processor. The image sensor may provide the at least one processor with image data obtained by reading out data input to a unit pixel of the image sensor at a first conversion gain and a second conversion gain lower than the first conversion gain.

An electronic device according to an embodiment may include an image sensor and at least one processor. The first mode may be a low-illuminance mode. The image sensor, in the first mode, may obtain the first image data by outputting the data input to the unit pixel of the image sensor two or more times at the first conversion gain and calculating an average conversion gain.

An electronic device according to an embodiment may include an image sensor and at least one processor. The first mode may be a normal mode. The image sensor may, in the first mode, obtain the first image data by outputting the data input to the unit pixel of the image sensor at the first conversion gain or outputting the data input to the unit pixel of the image sensor at the second conversion gain.

An electronic device according to an embodiment may include an image sensor and at least one processor. The image sensor may provide the at least one processor, in the first mode, with third image data having the second number of bits, wherein the third image data is obtained by adding dummy data having a third number of bits to the first image data having the first number of bits.

An electronic device according to an embodiment may include an image sensor and at least one processor. The image sensor may provide the at least one processor, in the first mode, with the first image data having the first number of bits and fourth image data having the first number of bits, wherein the first image data may be obtained by outputting the data input to the unit pixel of the image sensor during a first exposure time at the first conversion gain, and wherein the fourth image data may be obtained by outputting the data input to the unit pixel of the image sensor during a second exposure time at the second conversion gain.

An electronic device according to an embodiment may include an image sensor and at least one processor. The image sensor may provide the at least one processor, in the first mode, with third image data having the second number of bits and fifth image data having the second number of bits, wherein the third image data may be obtained by adding dummy data having a third number of bits to the first image data, and wherein the fifth image data may be obtained by adding the dummy data having the third number of bits to the fourth image data.

An electronic device according to an embodiment may include an image sensor and at least one processor. The image sensor may provide the at least one processor, in the second mode, with the second image data having the second number of bits and sixth image data having the second number of bits, wherein the second image data may be obtained by outputting the data input to the unit pixel of the image sensor during a first exposure time at the first conversion gain and the second conversion gain, and wherein the sixth image data may be obtained by outputting the data input to the unit pixel of the image sensor during a second exposure time at the first conversion gain and the second conversion gain.

An electronic device according to an embodiment may include an image sensor and at least one processor. The image sensor may add an embedded header to the first image data and the second image data and provide the embedded header to the at least one processor. The embedded header may include information about a number of bits of image data output by the image sensor. In an embodiment, the embedded header may include information about a type of conversion gain at which the data input to the unit pixel of the image sensor is output.

According to various embodiments of the present disclosure, it is possible to obtain an HDR image having fewer defects (e.g., a ghost phenomenon) in the image and a wider DR.

According to various embodiments of the present disclosure, even if the photographing mode of the electronic device switches depending on the illuminance of a photographing environment, the size of data may remain constant, so there may be no interruption in data flow. Since a constant size of data is input to an application processor (AP), image data may be easily processed. A user is able to obtain images in various photographing modes depending on the illuminance through the electronic device of the disclosure, and HDR images may be provided without interruption even when the photographing mode switches.

Advantages obtainable from the embodiments of the present disclosure are not limited to the advantages mentioned herein, and other advantages not mentioned may be clearly understood by those skilled in the art to which the disclosure pertains from the description below.

BRIEF DESCRIPTION OF THE DRAWINGS

The above and other aspects, features, and advantages of certain embodiments of the present disclosure will be more apparent from the following description taken in conjunction with the accompanying drawings.

DETAILED DESCRIPTION

Figure 1:
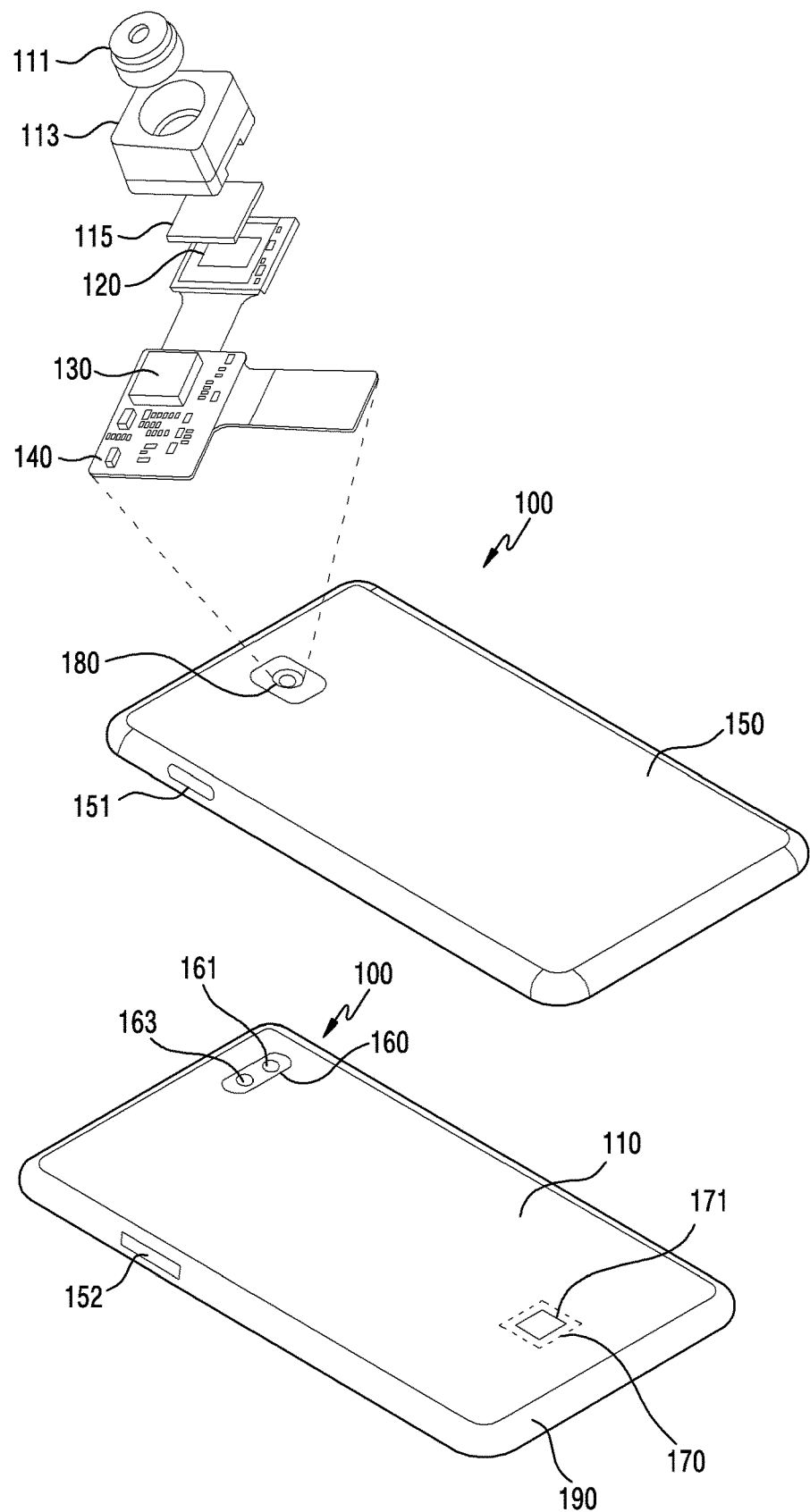
FIG. 1 illustrates structures of an electronic device and a camera module according to an embodiment.

FIG. 1 illustrates structures of an electronic device and a camera module according to an embodiment.

FIG. 1 is a diagram schematically illustrating an exterior of an electronic device 100 equipped with a camera module 180 and a camera module 180 according to an embodiment. Although the embodiment in FIG. 1 has been illustrated and described based on a mobile device, for example, a smartphone, it may be clearly understood by those skilled in the art that the embodiment may also be applied to an electronic device equipped with a camera, among various electronic devices or mobile devices.

Referring to FIG. 1, a display 110 may be disposed on a front surface of the electronic device 100 according to an embodiment. In an embodiment, the display 110 may occupy most of the front surface of the electronic device 100. The display 110 and a bezel 190 area surrounding at least some edges of the display 110 may be disposed on the front surface of the electronic device 100. The display 110 may include a flat area and a curved area extending from the flat area toward the sides of the electronic device 100. The electronic device 100 shown in FIG. 1 is only an example, and various embodiments are possible. For example, the display 110 of the electronic device 100 may include only a flat area without a curved area or may have a curved area only at one edge rather than both sides. In addition, in an embodiment, the curved area may extend to the rear surface of the electronic device so that the electronic device 100 may include an additional flat area.

In an embodiment, the electronic device 100 may further include a speaker, a receiver, a front camera, a proximity sensor, a home key, and the like. In the electronic device 100 according to an embodiment, a rear cover 150 may be provided to be integral with the main body of the electronic device. In another embodiment, the rear cover 150 may be configured to be separated from the main body of the electronic device 100, enabling replacement of a battery. The rear cover 150 may also be referred to as a battery cover or a rear cover.

In an embodiment, a fingerprint sensor 171 for recognizing a user's fingerprint may be included in a first area 170 of the display 110. The fingerprint sensor 171 may be disposed under the display 110 so as to be invisible to the user or be difficult to be viewed. In addition to the fingerprint sensor 171, a sensor for additional user/biometric authentication may be disposed in a partial area of the display 110. In another embodiment, a sensor for user/biometric authentication may be disposed in an area of the bezel 190. For example, an IR sensor for iris authentication may be exposed through an area of the display 110 or through an area of the bezel 190.

In an embodiment, a front camera 161 may be disposed in a second region 160 of the front surface of the electronic device 100. Although the embodiment in FIG. 1 shows that the front camera 161 is exposed through an area of the display 110, the front camera 161 may be exposed through the bezel 190 in another embodiment. In another embodiment (not shown), the display 110 may include at least one of an audio module (e.g., the audio module 1270 in FIG. 12), a sensor module (e.g., the sensor module 1276 in FIG. 12 or the sensor 163), a camera module (e.g., the camera module 1280 in FIG. 12 or the front camera 161), and a light-emitting element (not shown), provided on the rear surface of the second area 160. For example, the camera module 180 may be disposed on the front surface and/or the side surface of the electronic device 100 so as to face the front surface and/or the side surface. For example, the front camera 161 may not be visually exposed to the second area 160 and may include a hidden under-display camera (UDC).

In an embodiment, the electronic device 100 may include one or more front cameras 161. For example, the electronic device 100 may include two front cameras such as a first front camera and a second front camera. In an embodiment, the first front camera and the second front camera may be the same type of camera having the same specifications (e.g., pixels), but the first front camera and the second front camera may be implemented to have different specifications. The electronic device 100 may support functions related to a dual camera (e.g., 3D shooting, auto focus, etc.) through two front cameras. The above description of the front camera may be equally or similarly applied to the rear camera of the electronic device 100.

In an embodiment, the electronic device 100 may further include a variety of hardware such as a flash or sensors 163 assisting photographing. For example, the electronic device 100 may include a distance sensor (e.g., a TOF sensor) for detecting a distance between a subject and the electronic device 100. The distance sensor may be applied both to the front camera and/or to the rear camera. The distance sensor may be disposed or included separately in the front camera and/or the rear camera.

In an embodiment, at least one physical key may be disposed on the side portion of the electronic device 100. For example, a first function key 151 for turning on/off the display 110 or turning on/off the power of the electronic device 100 may be disposed on the right edge of the front surface of the electronic device 100. In an embodiment, a second function key 152 for controlling the volume or screen brightness of the electronic device 100 may be disposed at the left edge of the front surface of the electronic device 100. In addition, additional buttons or keys may be disposed on the front surface or rear surface of the electronic device 100. For example, a physical button or touch button mapped to a specific function may be disposed in a lower area of the front bezel 190.

The electronic device 100 shown in FIG. 1 is only an example and does not limit the form of a device to which the technical concept disclosed in the disclosure is applied. For example, the technical concept of the disclosure may also be applied to a foldable electronic device capable of being folded horizontally or vertically using a flexible display and a hinge structure, a rollable electronic device capable of being rolled, a tablet, or a laptop computer. In addition, the technical concept of the disclosure may also be applied to the case where the first camera and the second camera facing in the same direction are able to be disposed to face in different directions through rotation, folding, or deformation of the device.

Referring to FIG. 1, the electronic device 100 according to an embodiment may include a camera module 180. The camera module 180 may include a lens assembly 111 (e.g., the lens assembly 1310 in FIG. 13), a housing 113, an infrared cut filter 115, an image sensor 120 (e.g., the image sensor 1330 in FIG. 13), and an image signal processor (ISP) 130 (e.g., the image signal processor 1360 in FIG. 13).

In an embodiment, the lens assembly 111 may differ in the number, arrangement, and types of lenses depending on the front camera and the rear camera. The front camera 161 and the rear camera may have different properties (e.g., focal length and maximum magnification) depending on the type of the lens assembly 111. The lens may move back and forth along the optical axis and operate to change the focal length such that a target object as a subject is to be clearly photographed.

In an embodiment, the camera module 180 may include a housing 113 that has a body tube in which at least one lens aligned on the optical axis is mounted and at least one coil and/or magnet mounted to surround the circumference of the body tube, based on the optical axis (not shown) as the center thereof. In an embodiment, the camera module 180 may perform a stabilization function (e.g., optical image stabilization (OIS)) on the image obtained by the image sensor 120 using at least one coil and/or magnet included in the housing 113. For example, one or more coils may interact electromagnetically with each other under the control of a control circuit (e.g., the image signal processor 130 in FIG. 1, the processor 220 in FIG. 2, the processor 1220 in FIG. 12, or the image signal processor 1360 in FIG. 13). For example, the camera module 180, under the control of the processor, may control the electromagnetic force by controlling the direction and/or intensity of a current passing through at least one coil, and move (rotate) the lens assembly 111 and at least a part of the housing (not shown) including the lens assembly 111 in a direction substantially perpendicular to the optical axis (not shown) using the Lorentz force by the electromagnetic force.

In an embodiment, the camera module 180 may use other methods for the image stabilization function. For example, the camera module 180 may use video digital image stabilization (VDIS or DIS) or electrical image stabilization (EIS). In an embodiment, the camera module 180 may include a method of correcting image shaking by performing software processing on a data output value of the image sensor 120. For example, the camera module 180 may extract a motion vector, based on a difference between frames of an image (different images), through VDIS (or DIS), which is digital shaking correction, and process the image, thereby increasing the sharpness thereof. In addition, the camera module 180 may extract a motion vector, based on an image, through VDIS, and recognize a motion of the subject as shaking, in addition to the shaking of the electronic device 100. For example, the camera module 180 may extract the degree of shaking using a gyro sensor through EIS, which is electronic shaking correction, and then perform shaking correction in the same manner as VDIS.

In an embodiment, the infrared cut filter 115 may be disposed on the upper surface of the image sensor 120. An image of the subject that passed through the lens may be partially filtered by the infrared cut filter 115 and then detected by the image sensor 120.

In an embodiment, the image sensor 120 may be disposed on the printed circuit board 140 (e.g., a printed circuit board (PCB), a printed board assembly (PBA), a flexible PCB (FPCB), or a rigid-flexible PCB (RFPCB)). The image sensor 120 may be electrically connected to the image signal processor 130 that is connected to the printed circuit board 140 through a connector. A flexible printed circuit board (FPCB) or a cable may be used as the connector.

In an embodiment, the image sensor 120 may be a complementary metal oxide semiconductor (CMOS) sensor or a charged coupled device (CCD) sensor. A plurality of individual pixels may be integrated in the image sensor 120, and each of the individual pixels may include a micro-lens, a color filter, and a photodiode. Each of the individual pixels, as a type of photodetector, may convert an input light into an electrical signal. The photodetector is generally unable to detect the wavelength of the captured light by itself and is unable to determine color information. The photodetector may include a photodiode. For example, the image sensor 120 may amplify a current generated by the photoelectric effect of the light received through the lens assembly 111 in a receiving element. For example, each of the individual pixels may include a photoelectric transformation element (or a position sensitive detector (PSD)) (e.g., the photodiode 410 in FIG. 4) and a plurality of transistors (e.g., a reset transistor, a transmission transistor, a selection transistor, and a driver transistor). Details thereof will be described later with reference to FIG. 4.

In an embodiment, optical information of the subject incident through the lens assembly 111 may be converted into an electrical signal by the image sensor 120 and input into the image signal processor 130.

In an embodiment, if the image signal processor 130 and the image sensor 120 are physically separated, a sensor interface conforming to appropriate standards may electrically connect the image sensor 120 and the image signal processor 130.

In an embodiment, the image signal processor 130 may perform image processing on the electrically converted image data. The process in the image signal processor 130 may be divided into pre-ISP (hereinafter, pre-processing) and ISP chain (hereinafter, post-processing). The image processing before the demosaicking process may denote the pre-processing, and the image processing after the demosaicking process may denote the post-processing. The pre-processing may include 3A processing, lens shading correction, edge enhancement, dead pixel correction, and knee correction. The 3A may include at least one of auto white balance (AWB), auto exposure (AE), and auto focusing (AF). The post-processing may include at least one of changing sensor index values, changing tuning parameters, and adjusting aspect ratios. The post-processing may include processing image data output from the image sensor 120 or image data output from the scaler. The image signal processor 130 may adjust at least one of contrast, sharpness, saturation, and dithering of an image through the post-processing. Here, procedures of adjusting contrast, sharpness, and saturation may be executed in a YUV color space, and the dithering procedure may be executed in a red-green-blue (RGB) color space. Some of the pre-processing may be performed in the post-processing, or some of the post-processing may be performed in the pre-processing. In addition, some of the pre-processing may overlap some of the post-processing.

In an embodiment, the camera module 180 may be disposed on the front surface of the electronic device 100, as well as the rear surface thereof. In addition, the electronic device 100 may include a plurality of camera modules 180, as well as one camera module 180, in order to improve the camera performance. For example, the electronic device 100 may further include the front camera 161 for a video call or a selfie function. The front camera 161 may support a smaller number of pixels, compared to the rear camera module. The front camera 161 may be smaller than the camera module 180 of the rear camera.

Figure 2:
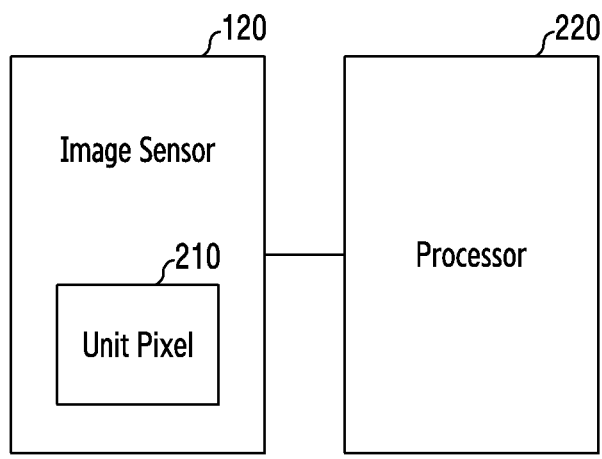
FIG. 2 is a block diagram illustrating hardware configuration of an electronic device according to an embodiment.

FIG. 2 is a block diagram illustrating hardware configuration of an electronic device 100 according to an embodiment.

Figure 12:
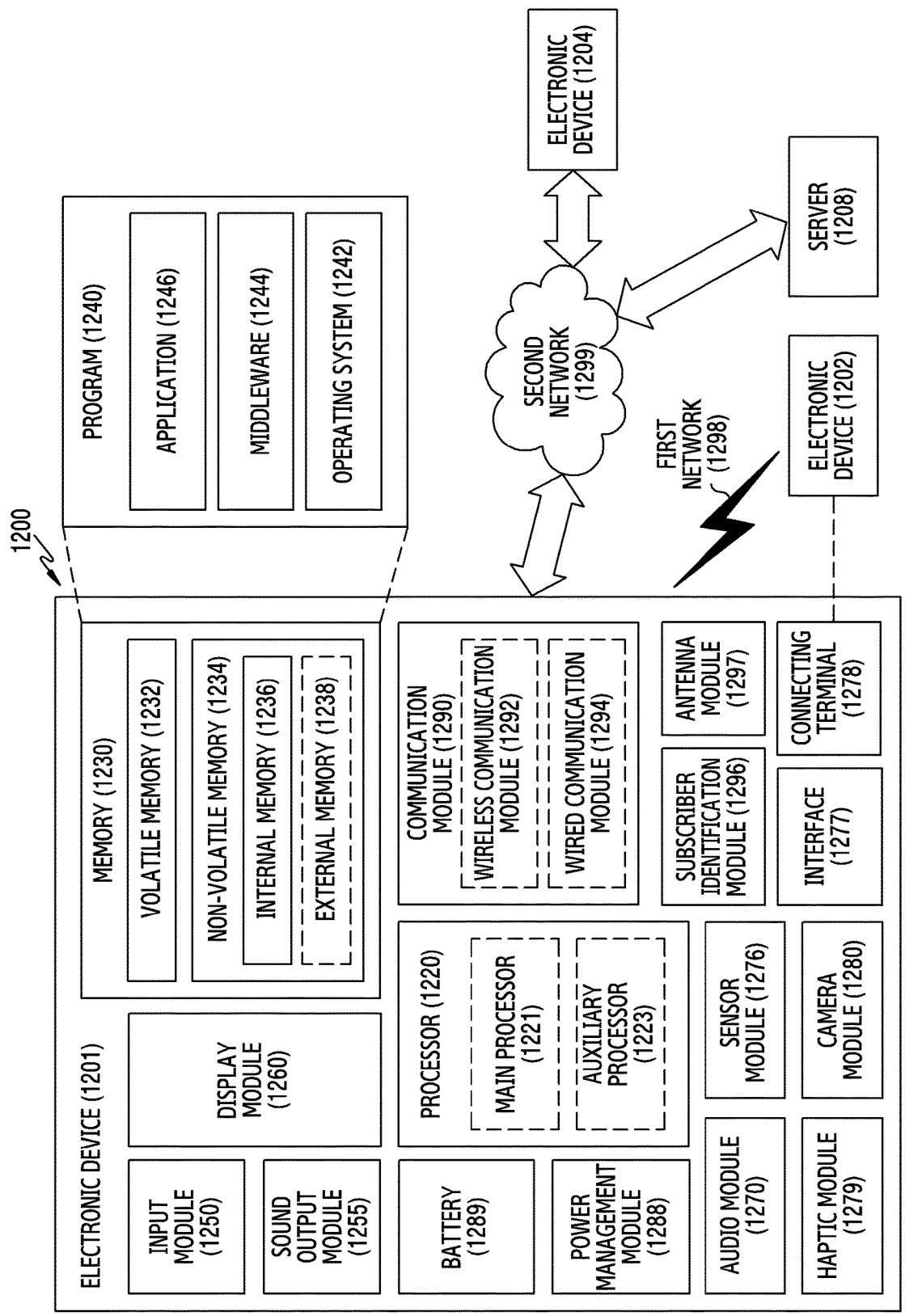
FIG. 12 is a block diagram of an electronic device in a network environment according to various embodiments.
Figure 13:
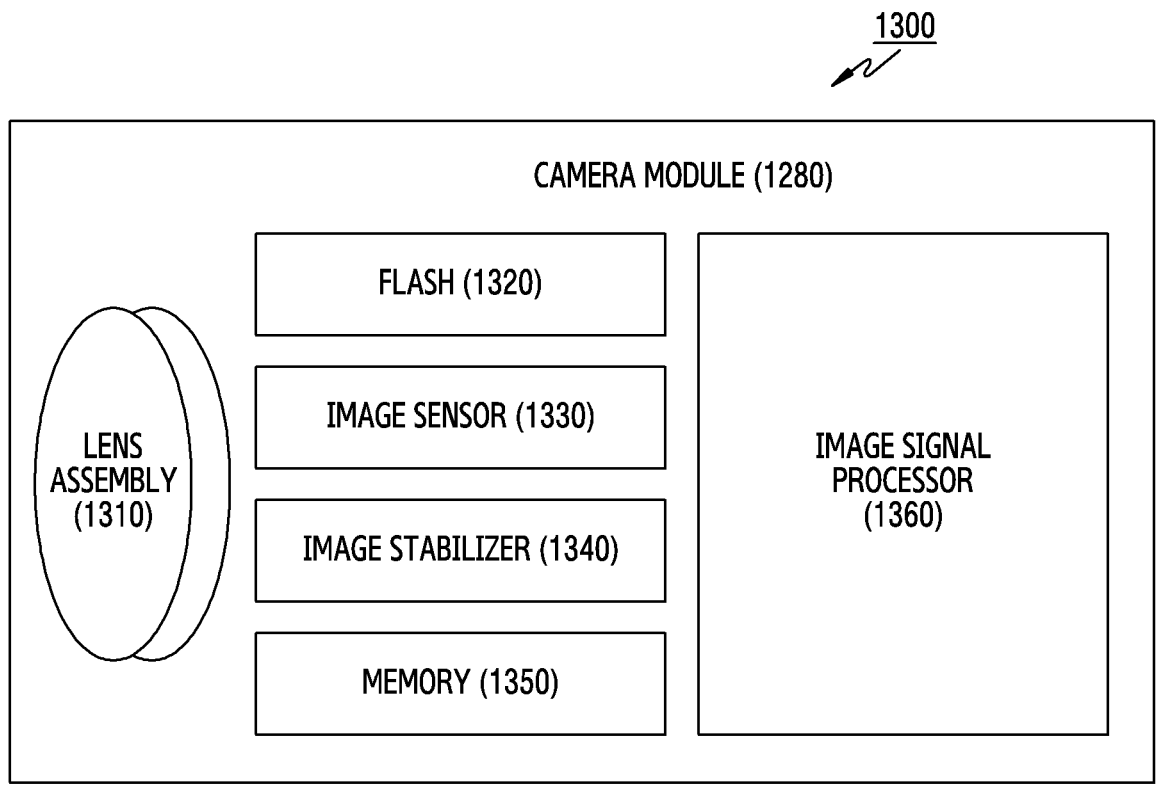
FIG. 13 is a block diagram illustrating a camera module according to various embodiments.

Referring to FIG. 2, in an embodiment, the electronic device 100 may include an image sensor 120 (e.g., the image sensor 120 in FIG. 1) and a processor 220 (e.g., the image signal processor 130 in FIG. 1, the processor 1220 in FIG. 12, or the image signal processor 1360 in FIG. 13). The image sensor 120 may include a unit pixel 210.

According to an embodiment, the image sensor 120 may be a CMOS image sensor. Optical information of a subject incident through the lens assembly 111 may be converted into an electrical signal by the image sensor 120 and provided to the processor 220. The image sensor 120 may read out data input to the unit pixel 210 at a high conversion gain (HCG) and/or a low conversion gain (LCG). The image sensor 120 may read out data input to the unit pixel 210, thereby obtaining image data having various number of bits. The image data having various number of bits may be understood that an image may have various DRs. For example, first image data may have a first DR. Second image data may have a second DR that is higher than the first DR. In an embodiment, the first DR may be defined as a first number of bits (e.g., 10 bits). The second DR may be defined as a second number of bits (e.g., 12 bits) larger than the first bit number. For example, the image sensor 120 may obtain image data having 10 or 12 bits and provide image data having 10 or 12 bits to the processor 220.

According to an embodiment, the image sensor 120 or the unit pixel 210 of the image sensor 120 may change the conversion gain depending on a photographing mode. Hereinafter, although a description may be made based on the image sensor 120 for the convenience of description, the following description may also be applied to the unit pixel 210. The conversion gain of the image sensor 120 may be HCG or LCG. In an embodiment, the image sensor 120 may have two floating diffusion (FD) regions. The conversion gain may vary depending on the size of a FD storage space of the image sensor 120. For example, FD may be distinguished into FD_C1 and FD_C2, and the conversion gain of the image sensor 120 may be HCG in the case where the image sensor 120 reads out the charge stored in FD_C1 and may be LCG in the case where the image sensor 120 reads out the charge stored in FD_C1 and FD_C2. In an embodiment, the image sensor 120 may adjust the conversion gain depending on turning on/off a dynamic range gate (DRG). For example, if the DRG is turned off, the conversion gain of the image sensor 120 may be HCG, and if the DRG is turned on, the conversion gain of the image sensor 120 may be LCG. A description related to this will be provided with reference to FIG. 4.

According to an embodiment, the amount of noise included in the image data obtained through the image sensor 120 and the dynamic range (DR) of the image thereof may vary depending on the conversion gain of the image sensor 120. For example, image data obtained by reading out at HCG may have a small amount of noise and a narrow DR. Image data obtained by reading out at LCG may have a large amount of noise and a wide DR.

According to an embodiment, image data provided from the image sensor 120 to the processor 220 may indicate an electrical signal output from each unit pixel 210 of the image sensor 120 by the light incident through the lens assembly 111. The image data may indicate color values of each unit pixel 210. The color value may include color information and brightness information. For example, in the case where the color filter array is configured as red (R), green (G), and blue (B) colors, image data of the unit pixel 210 may include color information of at least one or more of the R, the G, and the B. The green, red, and blue colors are only examples of the color values, and the color values are not limited to the colors mentioned herein. The color value may be at least one of red, green, blue, yellow, emerald, white, cyan, or magenta. According to various embodiments, the color filter array may include a color filter array of a red, green, blue, and emerald (RGBE) pattern, a cyan, yellow, and magenta (CYM) pattern, a cyan, yellow, green, and magenta (CYGM) pattern, or a red, green, blue, and white (RGBW) pattern.

According to an embodiment, the color filter array of the image sensor 120 may be disposed in various patterns. For example, the image sensor 120 may include a Bayer pattern, a tetra pattern, a quadra pattern, and/or a nona pattern. For example, the Bayer pattern may be a color filter array in which one pixel may have one color and in which one pixel having a red color, two pixels having a green color, and one pixel having a blue color are repeatedly disposed as one unit (e.g., 4 pixels). For example, the tetra pattern (or the quadra pattern) may be a color filter in which four pixels are disposed to have the same color, and the nona pattern may be a color filter in which nine pixels are disposed to have the same color. According to an embodiment, the image sensor 120 may output an embedded header (EMB) together with image data. The embedded header may include information about image data. In an embodiment, the embedded header may include at least one piece of information about the number of bits of image data output from the unit pixel 210 in a corresponding frame, information about the type of conversion gain at which data input to the unit pixel 210 is read out by the image sensor 120, frame-per-second (FPS) information, binning information, and information about the exposure time. For example, the embedded header may include information stating that the number of DR bits of image data is 10 or 12. Through information about the number of bits included in the embedded header, the processor 220 (or AP) may change the configuration state for processing image data depending on a difference in the number of bits of the image data. As another example, the embedded header may include information indicating that the image data is read out at HCG or LCG. For example, the binning information may be related to image processing in which a plurality of pixels is grouped as one pixel and used, and may include a process of rearranging the Bayer pattern into the tetra pattern.

According to an embodiment, the processor 220 may be understood to include at least one processor. For example, the processor 220 may include at least one of an application processor (AP), an image signal processor (ISP) 130, and a communication processor (CP). From this point of view, the processor 220 may be referred to as at least one processor or one or more processors.

According to an embodiment, the processor 220 may include an image signal processor 130 and an AP, and the image sensor 120 may provide image data to the image signal processor 130. The image signal processor 130 may provide the image data provided from the image sensor 120 to the AP. According to another embodiment, the processor 220 may denote the AP, and the image sensor 120 may directly provide image data to the AP.

According to an embodiment, the processor 220 (or the image signal processor 130) may analyze the image data provided from the image sensor 120 to determine whether or not a photographing mode is required to switch. If it is determined that the photographing mode is required to switch, the processor 220 may provide a photographing mode switch signal to the image sensor 120. The image sensor 120 may receive the photographing mode switch signal and switch the photographing mode.

According to an embodiment, the processor 220 or the AP may display, in real time, the image data provided from the image sensor 120 on the display 110 as a preview. The processor 220 may display, on the display 110, execution screens of applications or content such as images and/or videos stored in the memory.

According to an embodiment, the processor 220 may execute/control various functions supported by the electronic device 100. For example, the processor 220 may execute applications by executing codes written in programming languages, which are stored in the memory, and control a variety of hardware. For example, the processor 220 may execute an application, which is stored in the memory, supporting a photographing function. In addition, the processor 220 may execute the camera module 180, and configure and support an appropriate photographing mode for the camera module 180 to perform an operation intended by the user.

In an embodiment, applications related to the camera module 180 may be various types of applications. For example, a chat application, a web browser application, an e-mail application, or a shopping application may use the camera module 180 to support video calls, photo/video attachment, streaming services, and a product image or product-related virtual reality (VR) photographing function.

Figure 3A:
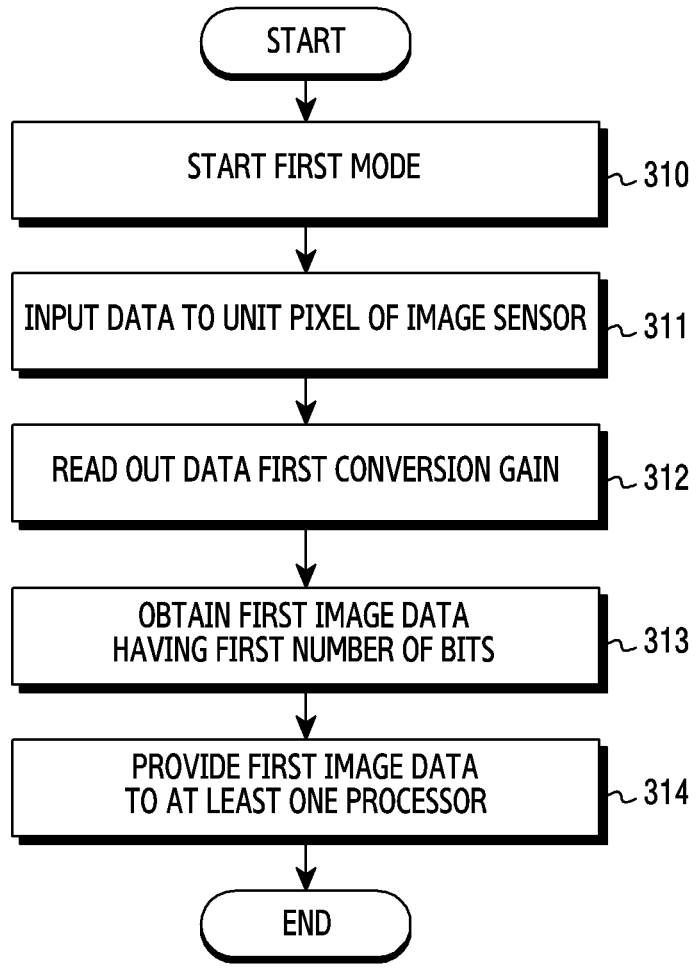
FIG. 3A is a flow diagram illustrating an exemplary process of operating an image sensor in a first mode according to an embodiment.

FIG. 3A is a flowchart illustrating the operation of an image sensor 120 in a first mode according to an embodiment.

According to an embodiment, in operation 310, the image sensor 120 may start photographing in a first mode. The first mode may be understood as a low-illuminance mode, a normal mode, or an MF HDR mode.

According to an embodiment, in operation 311, the image sensor 120 may receive data corresponding to optical information of a subject, which is input to an unit pixel (e.g., the unit pixel 210 in FIG. 2), through exposure thereof. For example, the data may be referred to as light amount data. The data may be an electrical signal.

According to an embodiment, in operation 312, the image sensor 120 may read out the data at a first conversion gain. The first conversion gain may correspond to HCG. The image sensor 120 may obtain image data by reading out data at HCG when the DRG is in an off state. An image obtained by the image sensor 120 reading out the same at HCG may have a small amount of noise but a narrow DR.

According to an embodiment, in operation 313, the image sensor 120 may obtain first image data having a first number of bits. The first number may be 10.

According to an embodiment, in operation 314, the image sensor 120 may provide the first image data to the processor 220.

According to an embodiment, the image sensor 120 may provide the first image data to the image signal processor 130. The image signal processor 130 may receive the first image data from the image sensor 120 and perform image processing on the same. The image signal processor 130 may provide image data obtained as a result of image processing to the AP. The AP may perform control to store the received image data in the memory or display the same on a display (e.g., the display 110 in FIG. 1).

According to an embodiment, the image sensor 120 may directly provide the first image data to the AP or the processor 220.

Figure 3B:
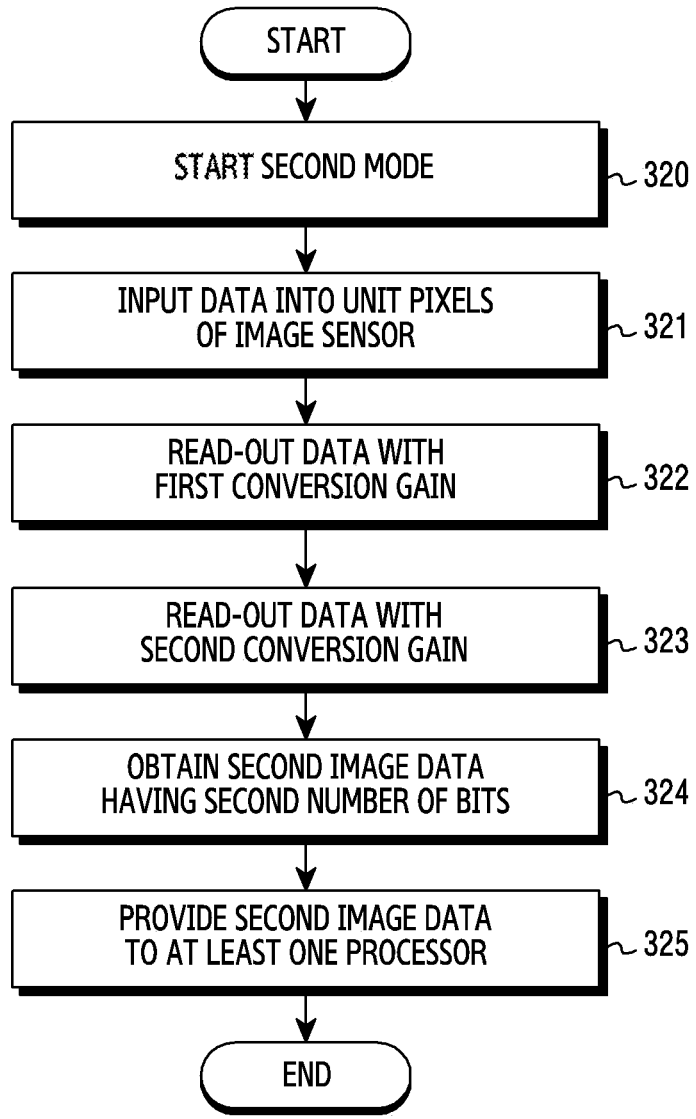
FIG. 3B is a flow diagram illustrating an exemplary process of operating an image sensor in a second mode according to an embodiment.

FIG. 3B is a flowchart illustrating the operation of an image sensor 120 in a second mode according to an embodiment.

According to an embodiment, in operation 320, the image sensor 120 may start photographing in a second mode. The second mode may be understood as a single-frame high-dynamic range (SF HDR) mode or an MF/SF HDR mode.

According to an embodiment, the second mode (e.g., the SF HDR mode) may be used in the case where the processor 220 determines that photographing need to be performed in the SF HDR mode depending on a surrounding environment or a main subject. For example, if photographing in a bright outdoors or backlight environment is detected, the processor 220 may determine that photographing needs to be performed in the SF HDR mode. The image signal processor 130 or the processor 220 may determine that photographing needs to be performed in the SF HDR mode through image analysis and provide a mode switch signal to the image sensor 120. The image sensor 120 may receive the mode switch signal through the image signal processor 130 or the processor 220 and start photographing in the SF HDR mode. In an embodiment, if photographing in a bright outdoors or backlight environment is detected, the processor 220 may determine that photographing needs to be performed in an MF HDR mode or MF/SF HDR mode. The MF HDR mode and the MF/SF HDR mode will be described later with reference to FIGS. 7 to 9.

According to an embodiment, in operation 321, the image sensor 120 may receive data corresponding to optical information of a subject, which is input to an unit pixel (e.g., the unit pixel 210 in FIG. 2), through exposure thereof. The data may be an electrical signal.

According to an embodiment, in operation 322, the image sensor 120 may read out the data at a first conversion gain. The first conversion gain may correspond to HCG. The image sensor 120 may read out the data at HCG when the DRG is in an off state.

According to an embodiment, in operation 323, the image sensor 120 may read out the data at a second conversion gain. The second conversion gain may correspond to LCG. The image sensor 120 may read out the data at LCG when the DRG is in an on state.

According to an embodiment, in operation 324, the image sensor 120 may obtain second image data having a second number of bits. The second number may be 12.

According to an embodiment, the image sensor 120 may read out data input to the unit pixel 210 at the first conversion gain (e.g., HCG) and the second conversion gain (e.g., LCG), thereby obtaining image data having a greater number, compared to the case of reading out data only at the first conversion gain (e.g., HCG). The image sensor 120 may output image data having the second number of (e.g., 12) bits, which is larger than the first number (e.g., 10), in order to reduce loss of the electrical signal stored in the image sensor 120 in the second mode (e.g., the SF HDR mode). Compared to the first image data having the first number of (e.g., 10) bits, the second image data having the second number of (e.g., 12) bits may include a greater number of color values or a wider color range.

According to an embodiment, in operation 325, the image sensor 120 may provide the second image data to the processor 220.

According to an embodiment, the image sensor 120 may provide the second image data to the image signal processor 130. The image signal processor 130 may receive the second image data from the image sensor 120 and perform image processing on the same. The image signal processor 130 may provide image data obtained as a result of image processing to the AP. The AP may perform control to store the received image data in the memory or display the same on a display (e.g., the display 110 in FIG. 1).

According to an embodiment, the image sensor 120 may directly provide the second image data to the AP or the processor 220.

Figure 4:
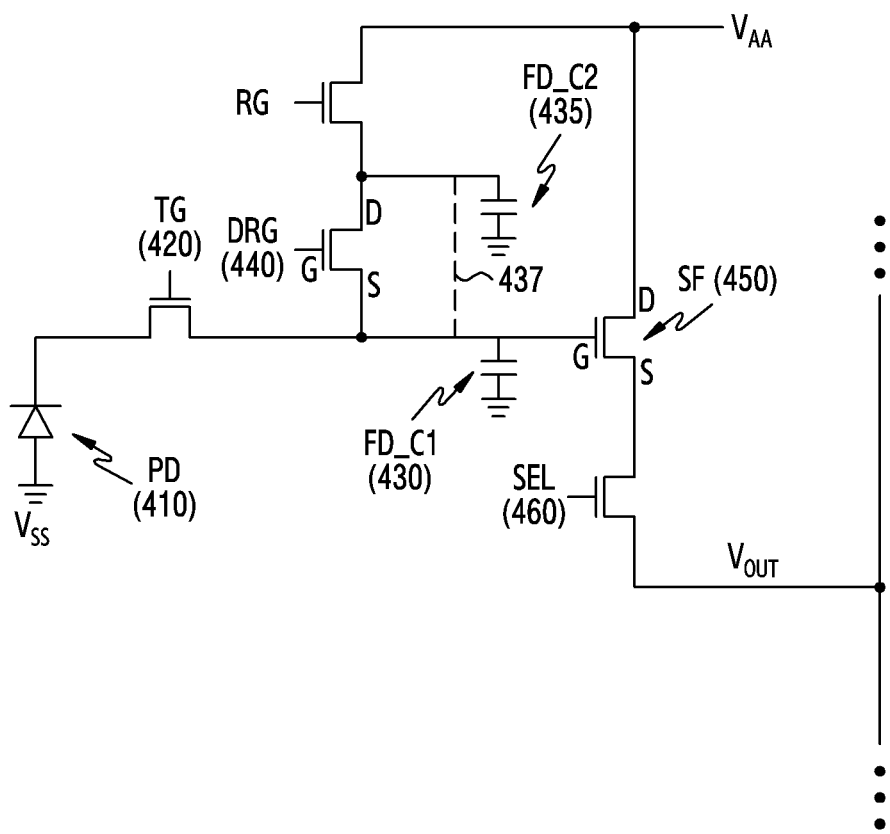
FIG. 4 is an internal circuit diagram of an exemplary unit pixel of an image sensor capable of adjusting a conversion gain according to an embodiment.

FIG. 4 is an internal circuit diagram of a unit pixel 210 of an image sensor 120 capable of adjusting a conversion gain according to an embodiment.

According to an embodiment, the unit pixel 210 may include a photodiode 410, a transfer gate (TG) 420, a floating diffusion (FD) 430 or 435, a dynamic range gate (DRG) 440, a source follower (SF) 450, a row select (hereinafter, SEL) 460, and a reset gate (RG).

According to an embodiment, the charge accumulated in the photodiode 410 during an exposure time may move to FD_C1 430 and FD_C2 435 while TG 420 is turned on. The charge stored in FD_C1 430 and FD_C2 435 may be read out through SF 450 and output as an electrical signal. The image sensor 120 may change SEL 460 from an off state to an on state in order to output image data of a specific row, and an electrical signal $V_{out}$ corresponding to the amount of charge stored in the FDs 430 and 435 may be output.

According to an embodiment, the image sensor 120 may include the DRG 440 and two FD regions. The conversion gain of the image sensor 120 may vary depending on the size of an FD storage space. The image sensor 120 may perform reading out at HCG if the size of the FD storage space is small and perform reading out at LCG if the size of the FD storage space is large. For example, FD may be distinguished into FD_C1 430 and FD_C2 435, and the image sensor 120 may read out the charge stored in FD_C1 430 at HCG and read out the charge stored in FD_C1 430 and FD_C2 435 at LCG.

According to an embodiment, the image sensor 120 may adjust the conversion gain depending on turning on/off the DRG 440. For example, if the DRG 440 is turned off, the conversion gain of the image sensor 120 may be HCG, and if the DRG 440 is turned on, the conversion gain of the image sensor 120 may be LCG.

According to an embodiment, after the image sensor 120 may read out data input to the unit pixel 210 at HCG through one-time exposure and then read out the same at LCG subsequently.

According to an embodiment, the image sensor 120 may include a structure enabling the charges with which FD_C1 430 is filled to overflow to FD_C2 435. For example, the image sensor 120 may include a predetermined path 437 connecting FD_C1 430 and FD_C2 435, and the charges with which FD_C1 430 is filled may overflow to FD_C2 435 through the predetermined path 437. As another example, the charges with which FD_C1 430 is filled may flow into FD_C2 435 through an existing path formed in the image sensor 120. As another example, the charges with which FD_C1 430 is filled may overflow to FD_C2 435 through a predetermined path not shown. In addition thereto, the structure enabling the charges with which FD_C1 430 is filled to overflow to FD_C2 435 may be variously implemented by the person skilled in the art.

According to an embodiment, the image sensor 120 may adjust the conversion gain depending on turning on/off the DRG 440 to read out the charge stored in FD_C1 430 and FD_C2 435 at HCG through one-time exposure and then read out the same at LCG subsequently. For example, after reading out the charge stored in FD_C1 430 at HCG when the DRG 440 is in an off state, the DRG 440 may switch from the off state to an on state, and the charge stored in FD_C1 430 and FD_C2 435 may be read out at LCG. The image sensor 120 may obtain image data having 12 bits by reading out data input to the unit pixel 210 at HCG and LCG through one-time exposure.

Figure 5A:
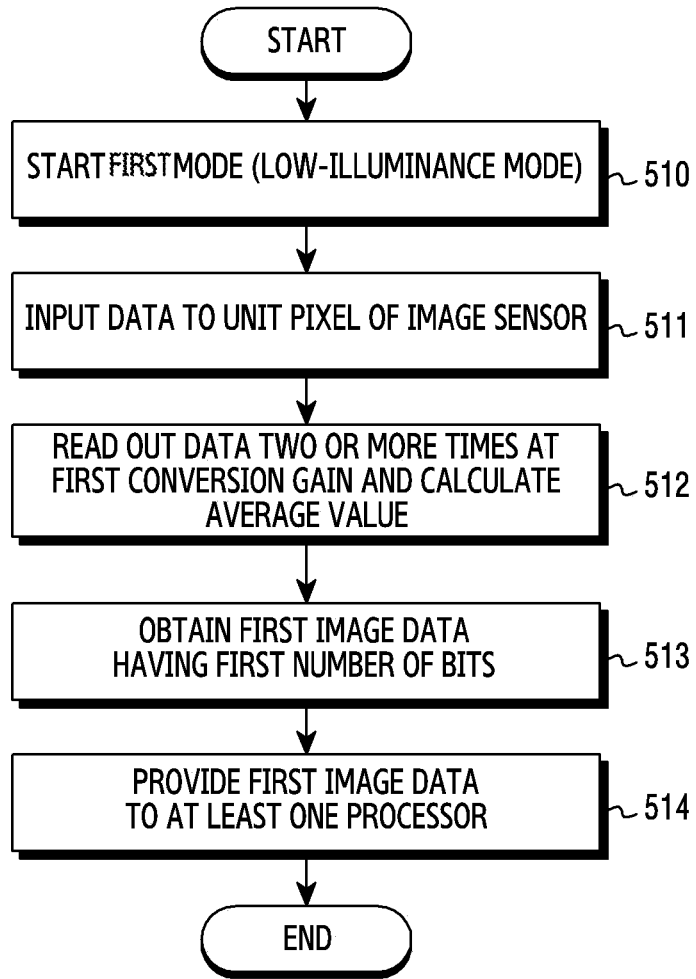
FIG. 5A is a flow diagram illustrating an exemplary process of operating an image sensor in a low-illuminance mode according to an embodiment.

FIG. 5A is a flowchart illustrating the operation of an image sensor 120 in a low-illuminance mode according to an embodiment. In FIG. 5A, the first mode may be a low-illuminance mode, the first conversion gain may be HCG, and the first number may be 10.

According to an embodiment, in operation 510, the image sensor 120 may start photographing in a low-illuminance mode. The low-illuminance mode may be used in the case where optical information of a subject is less than a reference value due to insufficient light in the surrounding environment of the electronic device 100. For example, if the user photographs a night scene or photographs a subject in a room with lights off, the electronic device 100 may start photographing in the low-illuminance mode. The low-illuminance mode of the electronic device 100 may be automatically configured by an illuminance sensor or an image sensor, or manually configured by user input.

According to an embodiment, in operation 511, the image sensor 120 may receive data, which corresponds to optical information of a subject, input to the unit pixel 210 through exposure of the unit pixel 210. The data may be an electrical signal. Operation 511 may correspond to operation 311.

According to an embodiment, in operation 512, the image sensor 120 may read out the data input to the unit pixel 210 at HCG two or more times and calculate an average value thereof. Since the amount of light is insufficient in the low illuminance environment, reading out may be performed at a high conversion gain. The image sensor 120 may reduce noises included in first image data through the process of reading out the data input to the unit pixel 210 two or more times and calculating the average value. In the case of reading out the data input to the unit pixel 210 two or more times, it may take a long time to read out the data and output image data from the image sensor 120 to the processor 220.

According to an embodiment, in operation 513, the image sensor 120 may obtain first image data having 10 bits. Since the color range of a landscape or subject to be photographed is not wide in the low-illuminance mode, image data having 10 bits may be output.

According to an embodiment, in operation 514, the image sensor 120 may provide the first image data to the processor 220. Operation 514 may correspond to operation 314.

Figure 5B:
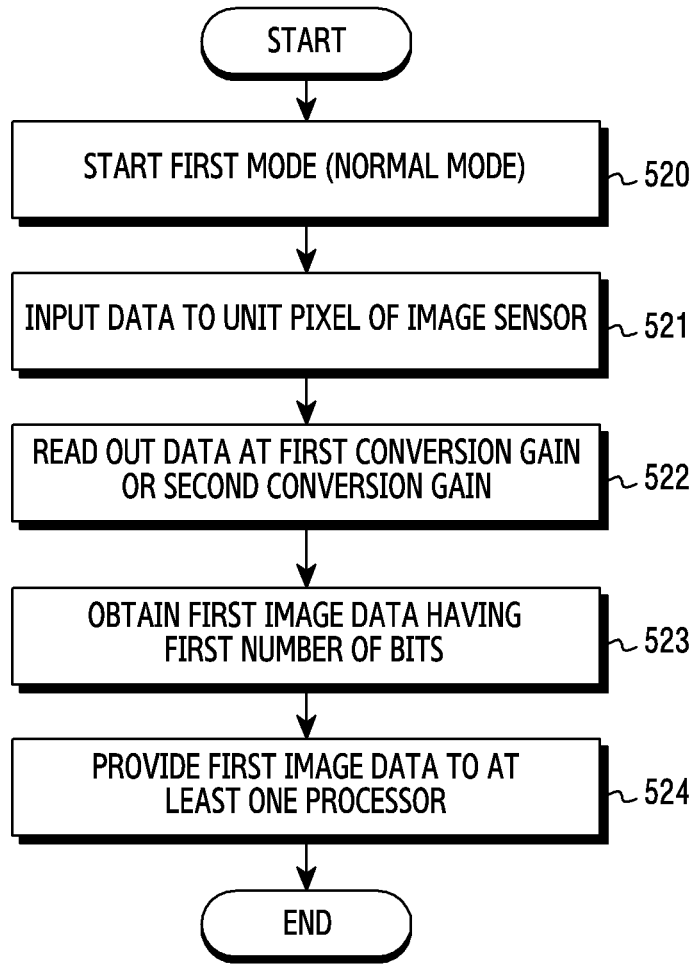
FIG. 5B is a flow diagram illustrating an exemplary process of operating an image sensor in a normal mode according to an embodiment.

FIG. 5B is a flowchart illustrating the operation of an image sensor 120 in a normal mode according to an embodiment. In FIG. 5B, the first mode may be a normal mode, the first conversion gain may be HCG, the second conversion gain may be LCG, and the first number may be 10.

According to an embodiment, in operation 520, the image sensor 120 may start photographing image in a normal mode. The normal mode may be used in the case where the surrounding environment of the electronic device 100 is brighter than in the low-illuminance mode, where optical information of a subject is greater than or equal to a reference value, and where the environment does not require an HDR image. For example, if the user photographs a landscape that is not backlit or a subject in the environment with sufficient light, the electronic device 100 may start photographing in the normal mode. The normal mode of the electronic device 100 may be automatically configured by an illuminance sensor or an image sensor, or may be manually configured by user input.

According to an embodiment, in operation 521, the image sensor 120 may receive data, which corresponds to optical information of a subject, input to the unit pixel 210 through exposure of the unit pixel 210. The data may be an electrical signal. Operation 521 may correspond to operation 311.

According to an embodiment, in operation 522, the image sensor 120 may read out data input to the unit pixel 210 at HCG or LCG. In an embodiment, the image sensor 120 may read out the data at HCG or LCG depending on the illuminance of the photographing environment, the DR required in an image, or the amount of noise allowable in the image.

According to an embodiment, in operation 523, the image sensor 120 may obtain first image data having 10 bits. Since the color range of a landscape or subject to be photographed is not wide in the normal mode, the image sensor 120 may output image data having 10 bits.

According to an embodiment, in operation 524, the image sensor 120 may provide the first image data to the processor 220. Operation 524 may correspond to operation 314.

Figure 6:
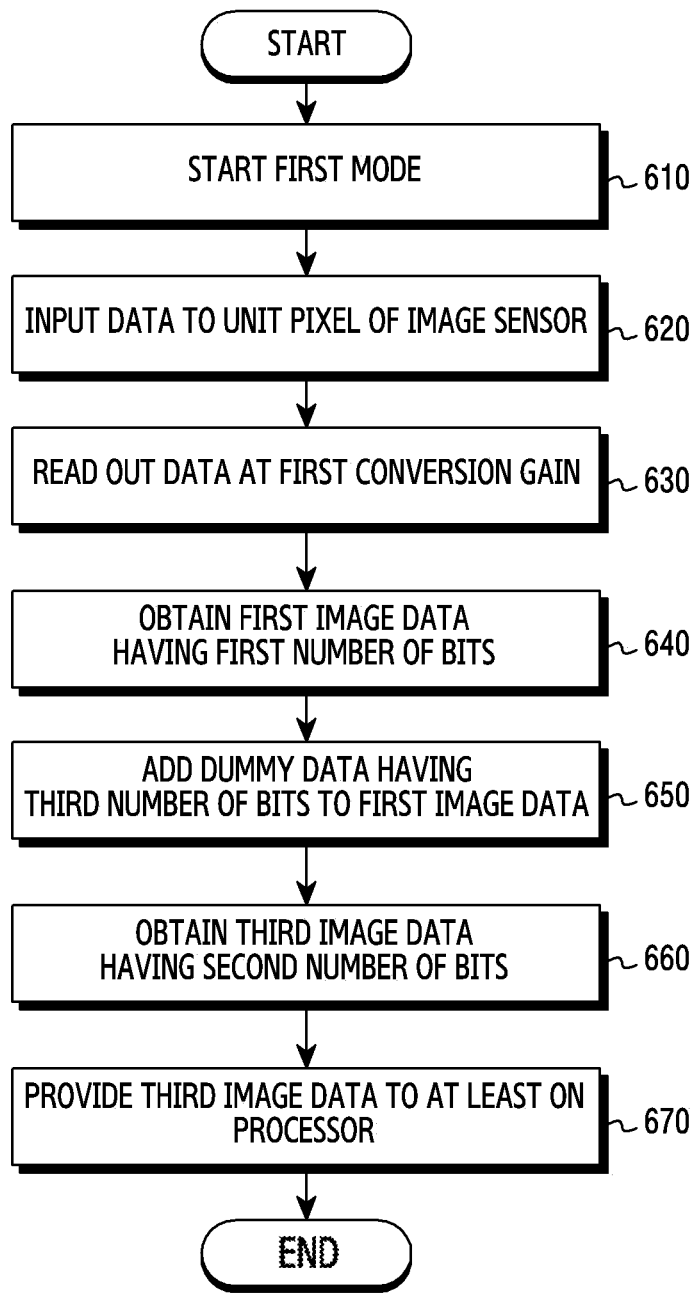
FIG. 6 is a flow diagram illustrating an exemplary process of operating an image sensor adding zero-padding in a first mode according to an embodiment.

FIG. 6 is a flowchart illustrating the operation of an image sensor adding zero-padding in a first mode according to an embodiment. In FIG. 6, it may be understood that the first conversion gain is HCG, the first number is 10, the third number is 2, and the second number is 12.

According to an embodiment, in operation 610, the image sensor 120 may start photographing in a first mode. The first mode may be understood as the low-illuminance mode or the normal mode.

According to an embodiment, in operation 620, the image sensor 120 may receive data, which corresponds to optical information of a subject, input to the unit pixel 210 through exposure of the unit pixel 210. The data may be an electrical signal. Operation 620 may correspond to operation 311.

According to an embodiment, in operation 630, the image sensor 120 may read out data at HCG. Operation 630 may correspond to operation 312.

According to an embodiment, in operation 640, the image sensor 120 may obtain first image data having 10 bits. Operation 640 may correspond to operation 313.

According to an embodiment, in operation 650, the image sensor 120 may add dummy data having 2 bits to the first image data having 10 bits. The dummy data may be added to a most significant bit (MSB) or least significant bit (LSB) of the first image data.

According to an embodiment, the dummy data may be data that makes the number of bits of each pixel of the first image data, provided from the image sensor 120 to the processor 220 in the first mode, the same as the number of bits of each pixel of the second image data provided from the image sensor 120 to the processor 220 in the second mode.

According to an embodiment, the image sensor 120 may be distinguished into a sensor module and a hardware module. In the hardware module that is a separate configuration from the sensor module, third image data may be generated by adding dummy data to the first image data. For example, the sensor module may output first image data having 10 bits in each unit pixel 210, and the separate hardware module may add dummy data having 2 bits for each unit pixel 210. The separate hardware module may be positioned between the sensor module and the processor 220, and electrically connected to the sensor module and the processor 220. The image data output from the sensor module may be provided to the processor 220 through the hardware module.

According to an embodiment, the image sensor 120 may add dummy data to the first image data obtained from the unit pixel 210. The image sensor 120 may generate third image data by adding dummy data. For example, the image sensor 120 may add dummy data having 2 bits for each unit pixel 210 to the first image data having 10 bits in each unit pixel 210, thereby generating third image data having 12 bits. The image sensor 120 may provide, to the processor 220, the third image data generated by adding dummy data thereto.

According to an embodiment, in operation 660, the image sensor 120 may obtain third image data having 12 bits.

According to an embodiment, if the first mode corresponds to the low-illuminance mode, the image sensor 120 may add an electrical signal obtained by reading out data input to the unit pixel 210 two or more times to the first image data, instead of adding dummy data having 2 bits to the MSB or LSB of the first image data having 10 bits, thereby obtaining third image data. The image sensor 120 may obtain third image data having 12 bits by adding an electrical signal obtained by reading out data, input to the unit pixel 210 two or more times, to the first image data.

According to an embodiment, in operation 670, the image sensor 120 may provide the third image data to the processor 220.

According to an embodiment, in the case where the image sensor 120 provides first image data having 10 bits to the processor 220 in the first mode and provides second image data having 12 bits to the processor 220 in the second mode, since the number of bits of image data input to the processor 220 differs, the configuration state of the processor 220 may be required to be changed when the photographing mode switches. Accordingly, when the photographing mode switches, the flow of data may be interrupted. However, the addition of dummy data having 2 bits to the first image data having 10 bits in operation 650 makes the processor 220 consistently receive image data having 12 bits. Since there is no change in the number of bits of image data provided to the processor 220 even when the photographing mode switches, the processor 220 may process image data without changing the configuration state thereof. The electronic device 100 may provide a seamless preview image displayed on the display 110 when the photographing mode switches. For example, even if the environment changes from a low illuminance environment to an environment requiring the HDR image while photographing the surrounding environment using the electronic device 100, the user may continue photographing without interruption.

People skilled in the art will realize that the first number, the second number, and the third number mentioned in this disclosure are not limited to the numbers given in the examples in the present disclosure. In some embodiments, the second number is equal to the sum of the first number and the third number. Other such examples may be assumed. For example, if the first number is 12 and if the second number is 14, the third number may be 2. In addition, if the first number is 10 and if the second number is 14, the third number may be 4.

Figure 7:
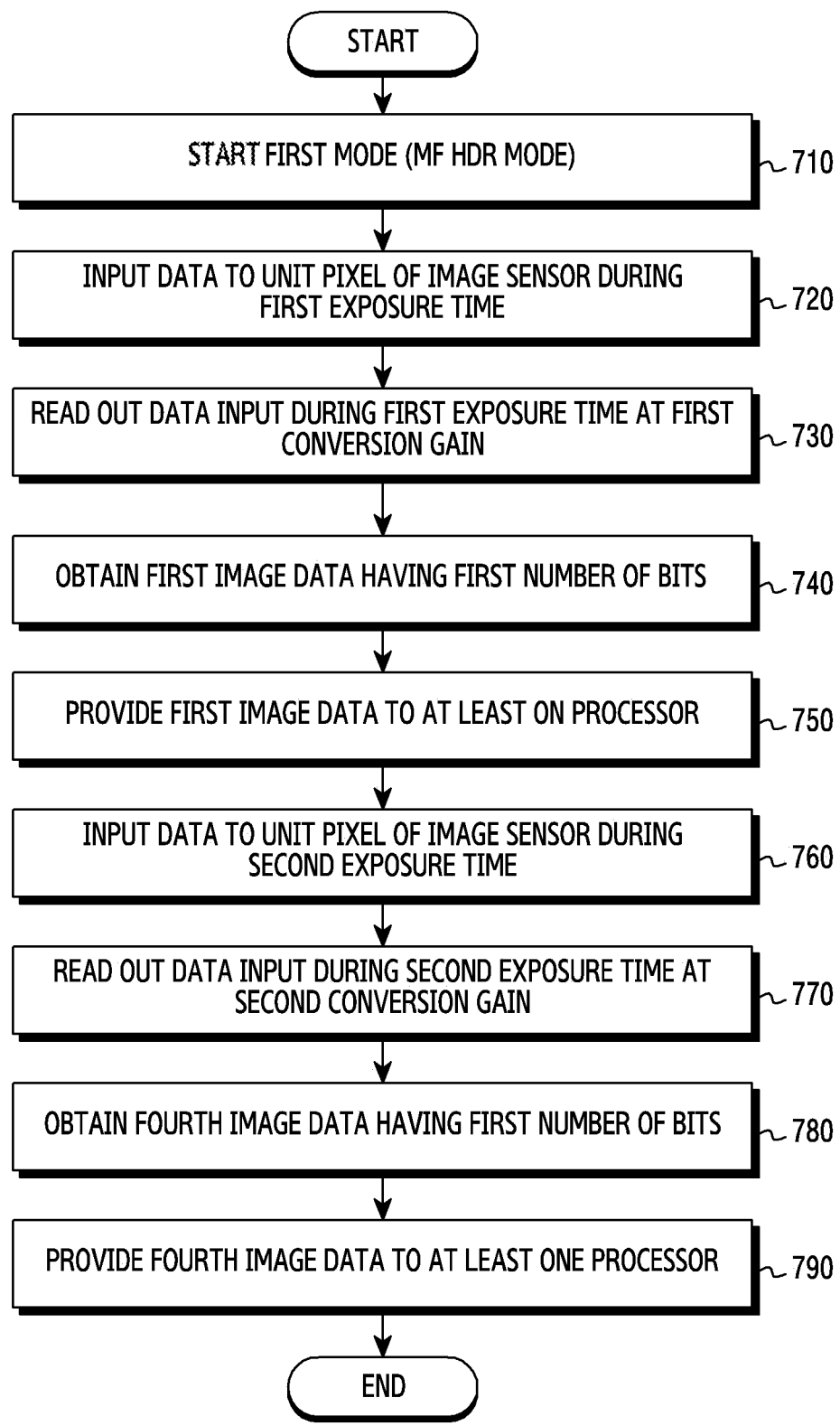
FIG. 7 is a flow diagram illustrating an exemplary process of operating an image sensor in an MF HDR mode according to an embodiment.

FIG. 7 is a flowchart illustrating the operation of an image sensor 120 in an multi-frame high-dynamic range (MF HDR) mode according to an embodiment. In FIG. 7, it may be understood that the first mode is an MF HDR mode, the first conversion gain is HCG, the second conversion gain is LCG, and the first number is 10.

According to an embodiment, in operation 710, the image sensor 120 may start photographing in an MF HDR mode. The MF HDR mode may indicate a method of obtaining two or more different images through data input to the unit pixel 210 during different exposure times by the image sensor 120 and generating an HDR image by synthesizing two or more images by the processor 220. For example, if the photographing background is a backlight environment or bright outdoor environment, the electronic device 100 may start photographing in the MF HDR mode. The MF HDR mode of the electronic device 100 may be automatically configured by an illuminance sensor or an image sensor, or manually configured by user input.

According to an embodiment, in operation 720, the image sensor 120 may receive data, which corresponds to optical information of a subject, input to the unit pixel 210 through exposure of the unit pixel 210 for a first exposure time. The data may be an electrical signal.

According to an embodiment, in operation 730, the image sensor 120 may read out data, input to the unit pixel 210 during the first exposure time, at HCG.

According to an embodiment, in operation 740, the image sensor 120 may obtain first image data having 10 bits.

According to an embodiment, in operation 750, the image sensor 120 may provide the first image data having 10 bits to the processor 220.

According to an embodiment, in operation 760, the image sensor 120 may receive data, which corresponds to optical information of the subject, input to the unit pixel 210 through exposure of the unit pixel 210 for a second exposure time. The data may be an electrical signal.

According to an embodiment, the first exposure time may be greater than the second exposure time. The amount of light signal input to the photodiode 410 of the unit pixel 210 during the first exposure time may be greater than the amount of light signal input to the photodiode 410 of the unit pixel 210 during the second exposure time. The amount of data input to the unit pixel 210 during the first exposure time may be greater than the amount of data input to the unit pixel 210 during the second exposure time.

According to an embodiment, in operation 770, the image sensor 120 may read out data, input to the unit pixel 210 during the second exposure time, at LCG.

According to an embodiment, the image sensor 120 may read out data, input to the unit pixel 210 during the first exposure time, at HCG and read out data, input to the unit pixel 210 during the second exposure time less than the first exposure time, at LCG. Reading out may be performed at a high conversion gain in the case of long exposure and at a low conversion gain in the case of short exposure, so that the difference in exposure time between the long exposure and the short exposure may be reduced. If the difference between the first exposure time and the second exposure time is reduced, defects (e.g., ghost effect) in the HDR image that may occur due to a difference between images of a moving subject may be reduced.

According to an embodiment, in operation 780, the image sensor 120 may obtain fourth image data having 10 bits.

According to an embodiment, in operation 790, the image sensor 120 may provide the fourth image data having 10 bits to the processor 220.

According to an embodiment, the sequence of operations 720 to 750 and operations 760 to 790 may vary. In addition, the sequence of long exposure and short exposure may vary in the MF HDR mode.

Figure 8:
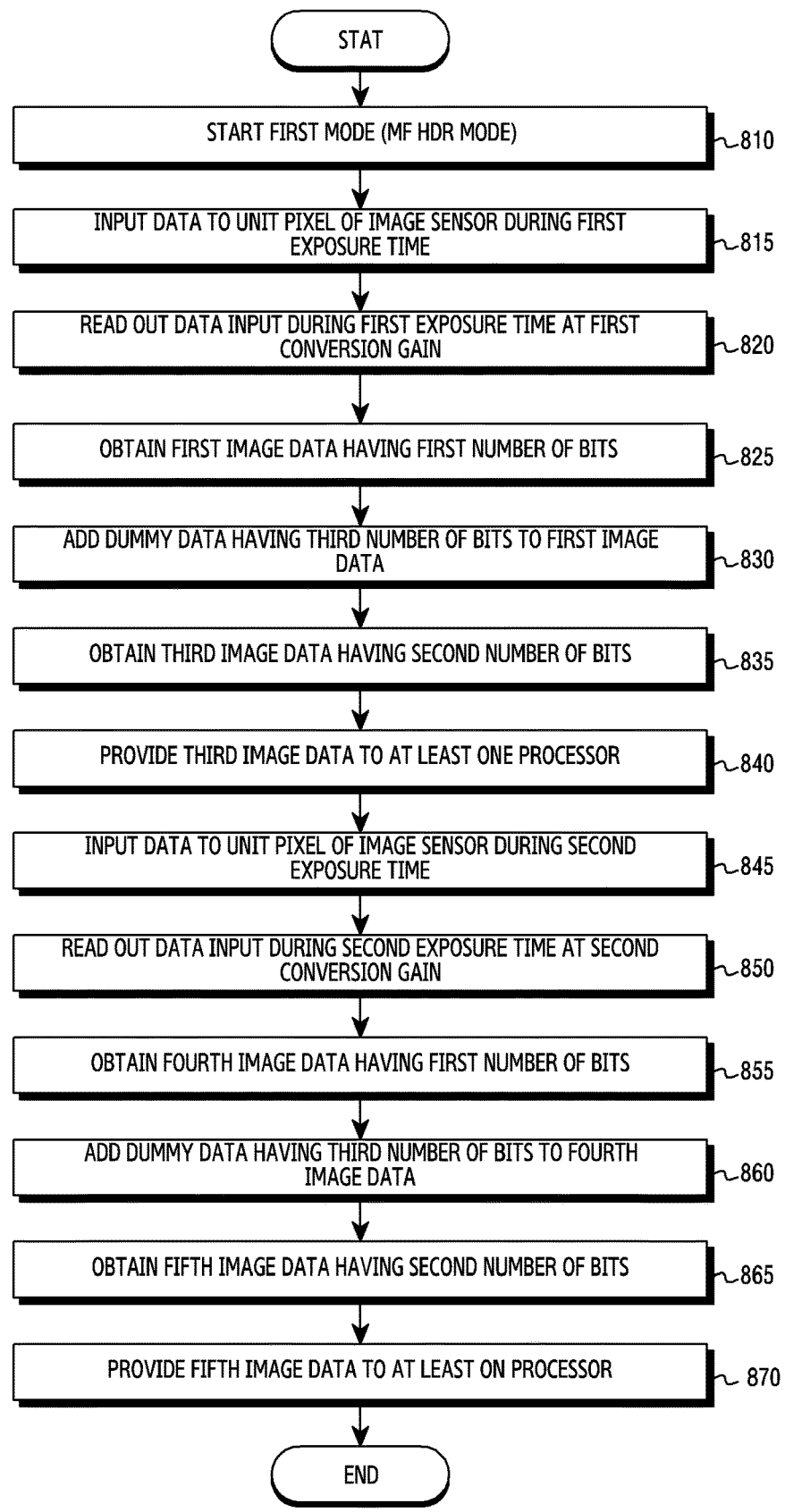
FIG. 8 is a flow diagram illustrating an exemplary process of operating an image sensor when zero padding is added in an MF HDR mode according to an embodiment.

FIG. 8 is a flowchart illustrating the operation of an image sensor 120 when zero padding is added in an MF HDR mode according to an embodiment. In FIG. 8, it may be understood that the first mode is an MF HDR mode, the first conversion gain is HCG, the second conversion gain is LCG, the first number is 10, the third number is 2, and the second number is 12.

According to an embodiment, operations 810 to 825 may correspond to operations 710 to 740.

According to an embodiment, in operation 830, the image sensor 120 may add dummy data having 2 bits to first image data having 10 bits. Operation 830 may correspond to operation 650.

According to an embodiment, in operation 835, the image sensor 120 may obtain third image data having 12 bits.

According to an embodiment, in operation 840, the image sensor 120 may provide the third image data to the processor 220.

According to an embodiment, operations 845 to 855 may correspond to operations 760 to 780.

According to an embodiment, in operation 860, the image sensor 120 may add dummy data having 2 bits to fourth image data having 10 bits. Operation 830 may correspond to operation 650.

According to an embodiment, in operation 865, the image sensor 120 may obtain fifth image data having 12 bits.

According to an embodiment, in operation 870, the image sensor 120 may provide the fifth image data to the processor 220.

According to an embodiment, the sequence of operations 815 to 840 and operations 845 to 870 may vary. In addition, the sequence of long exposure and short exposure may vary in the MF HDR mode.

Figure 9:
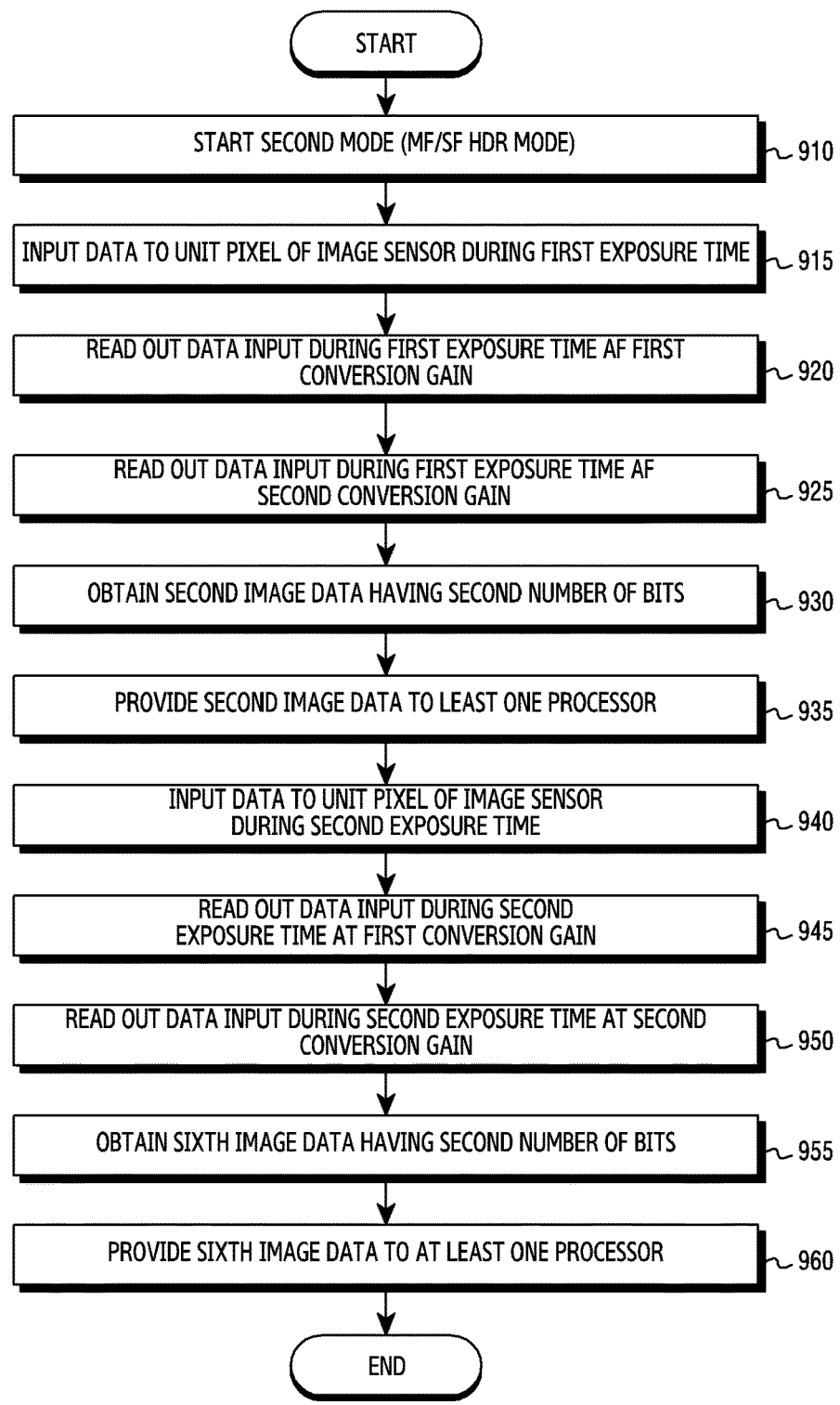
FIG. 9 is a flow diagram illustrating an exemplary process of operating an image sensor in which an MF HDR mode and a single-frame high-dynamic range (SF HDR) mode are combined according to an embodiment.

FIG. 9 is a flowchart illustrating the operation of an image sensor 120 in which an MF HDR mode and a single-frame high-dynamic range (SF HDR) mode are combined according to an embodiment. In FIG. 9, it may be understood that the second mode is an MF/SF HDR mode, the first conversion gain is HCG, the second conversion gain is LCG, and the second number is 12.

According to an embodiment, in operation 910, the image sensor 120 may start photographing in an MF/SF HDR mode. The MF/SF HDR mode may denote a method of obtaining two or more images by reading out data input to the unit pixel 210 at HCG during different exposure times and then reading out the data at LCG by the image sensor 120 and generating an HDR image by synthesizing two or more images by the processor 220. For example, the MF/SF HDR mode may be a mode obtained by combining the MF HDR mode and the SF HDR mode. The MF/SF HDR mode of the electronic device 100 may be configured automatically by an illuminance sensor or an image sensor or manually configured by user input.

According to an embodiment, in operation 915, the image sensor 120 may receive data, which corresponds to optical information of a subject, input to the unit pixel 210 through exposure of the unit pixel 210 for a first exposure time. The data may be an electrical signal. Operation 915 may correspond to operation 720.

According to an embodiment, in operation 920, the image sensor 120 may read out data, input to the unit pixel 210 during the first exposure time, at HCG.

According to an embodiment, in operation 925, the image sensor 120 may read out data, input to the unit pixel 210 during the first exposure time, at LCG.

According to an embodiment, in operation 930, the image sensor 120 may obtain second image data having 12 bits. Operation 930 may correspond to operation 324.

According to an embodiment, in operation 935, the image sensor 120 may provide the second image data to the processor 220. Operation 935 may correspond to operation 325.

According to an embodiment, in operation 940, the image sensor 120 may receive data, which corresponds to optical information of the subject, input to the unit pixel 210 through exposure of the unit pixel 210 for a second exposure time. Data may be an electrical signal. Operation 940 may correspond to operation 760.

According to an embodiment, in operation 945, the image sensor 120 may read out data, input to the unit pixel 210 during the second exposure time, at HCG.

According to an embodiment, in operation 950, the image sensor 120 may read out data, input to the unit pixel 210 during the second exposure time, at LCG.

According to an embodiment, in operation 955, the image sensor 120 may obtain sixth image data having 12 bits.

According to an embodiment, in operation 960, the image sensor 120 may provide the sixth image data to the processor 220.

According to an embodiment, the sequence of operations 915 to 935 and operations 940 to 960 may vary. In addition, the sequence of long exposure and short exposure may vary in the MF/SF HDR mode.

According to an embodiment, the image sensor 120 may perform reading out at HCG and LCG for the long exposure and perform reading out at HCG and LCG for the short exposure in the MF/SF HDR mode, thereby increasing the DR of the HDR image more than that in the MF HDR mode or the SF HDR mode.

Figure 10:
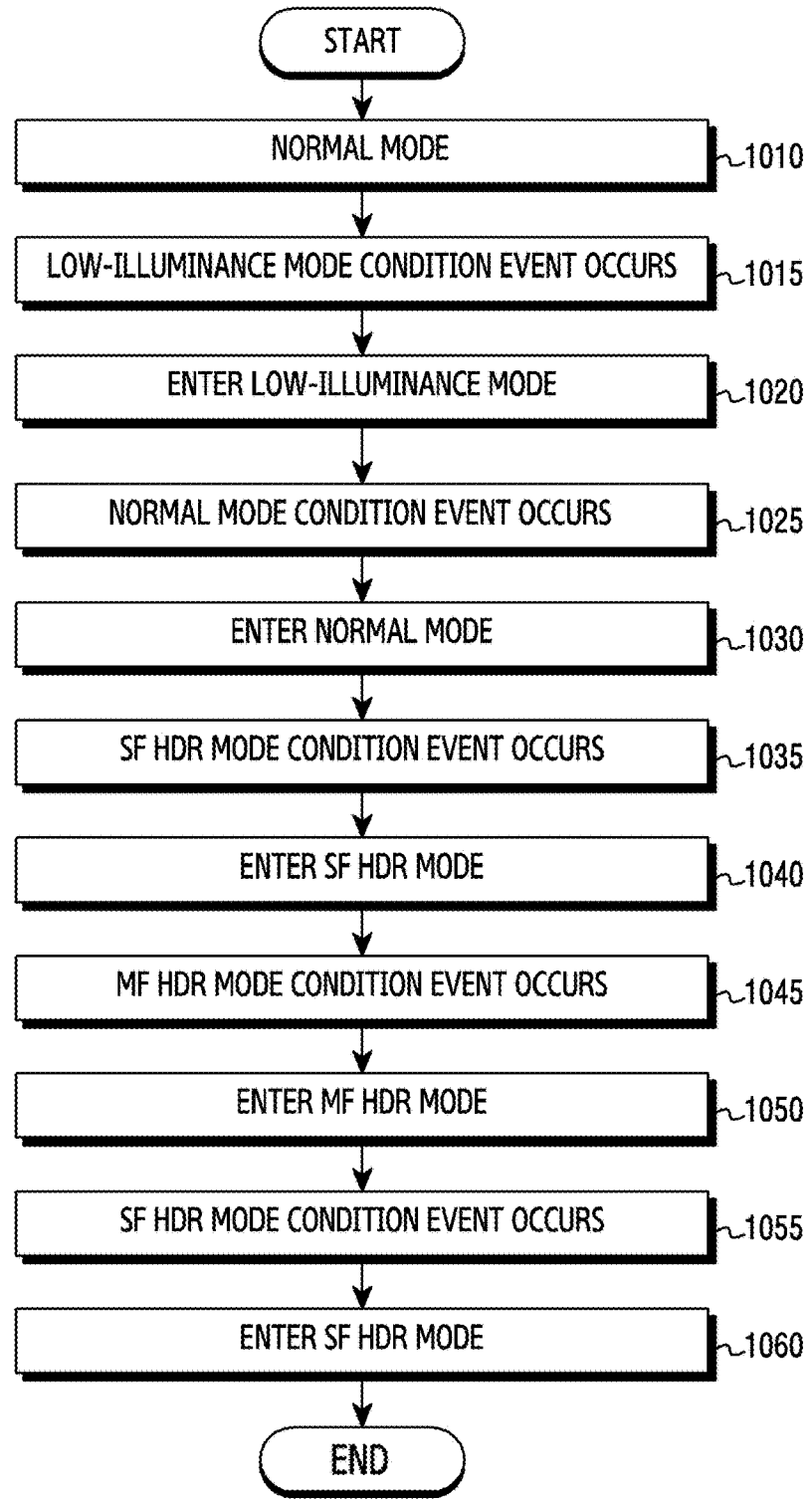
FIG. 10 illustrates an exemplary switching of a photographing mode of an electronic device based on illuminance according to an embodiment.

FIG. 10 illustrates an example in which a photographing mode of an electronic device 100 switches depending on illuminance according to an embodiment.

According to an embodiment, in operation 1010, the image sensor 120 may photograph a subject in the normal mode.

According to an embodiment, in operation 1015, a low-illuminance mode condition event may occur, and the image signal processor 130 or the processor 220 may provide a mode switch signal to the image sensor 120. For example, if an event in which the illuminance of the surrounding environment of the electronic device 100 is extremely reduced or in which a light signal for the subject is insufficient occurs, a mode switch signal may be provided to the image sensor 120.

According to an embodiment, in operation 1020, the image sensor 120 may photograph a subject in the low-illuminance mode.

According to an embodiment, in operation 1025, a normal mode condition event may occur, and the processor 220 may provide a mode switch signal to the image sensor 120. For example, if a light signal for the subject increases to a reference value or more due to an increase in illuminance of the surrounding environment, or if data input to the unit pixel 210 amounts to a reference value or more, the processor 220 may determine that a normal mode condition event has occurred.

According to an embodiment, in operation 1030, the image sensor 120 may photograph a subject in the normal mode.

According to an embodiment, in operation 1035, the processor 220 may provide a mode switch signal to the image sensor 120 in response to occurrence of an SF HDR mode condition event.

In an embodiment, the processor 220 may determine whether or not it is an HDR environment, based on brightness information of image data. The processor 220 may determine, through an auto exposure (AE) function, the HDR environment if a first region of the image has a first brightness, which is greater than or equal to a first threshold, and if a second region distinguished from the first region has a second brightness less than or equal to a second threshold, which is lower than the first brightness. If the HDR environment is detected, the processor 220 may determine that the photographing mode of the image sensor 120 is required to switch.

In an embodiment, the processor 220 may analyze the scene of an photographed image to determine whether or not it corresponds to an HDR environment. The processor 220 may analyze the scene of an photographed image and, if the photographed background is a backlight environment or bright outdoor environment, determine that it corresponds to the HDR environment. The processor 220 may determine whether or not an photographed image obtained by the camera is in the backlight environment or bright outdoor environment using a function (e.g., a scene optimizer). The function (e.g., a scene optimizer) may be a function capable of determining objects and backgrounds using data based on machine learning. For example, in the case of taking a photo or video under the sunlight, if a subject exhibits a certain brightness or less because the subject is backlit, the processor 220 may determine that it corresponds to the backlight environment. If the HDR environment is detected, the processor 220 may determine that the photographing mode of the image sensor 120 is required to switch. For example, the processor 220 may identify an environment related to the photographing mode using determination information (e.g., brightness, hue, saturation, tone curves (color curves), sharpness, clarity, or contrast) from the photographed image. For example, in the case of using tone curves, the processor 220 may compare average properties of determination information with properties of the obtained photographed image to predict the surrounding environment through machine learning or calculate the same in a histogram method. For example, in the case of using sharpness, the processor 220 may determine the surrounding environment using a difference between the gradient of the photographed image and average gradient distribution.

According to an embodiment, in operation 1040, the image sensor 120 may photograph the subject in the SF HDR mode.

According to an embodiment, in operation 1045, the MF HDR mode condition event may occur, and the processor 220 may provide a mode switch signal to the image sensor 120.

According to an embodiment, the SF HDR mode may be a mode for the image sensor 120 to output an HDR image, and the MF HDR mode may be a mode of generating an HDR image by synthesizing different images obtained by reading out data input to the unit pixel 210 during different exposure times by the AP (or the processor 220). The processor 220 may provide the image sensor 120 with a signal instructing to switch from the SF HDR mode to the MF HDR mode, based on the FPS, throughput in the AP, and power consumption or according to the user's configuration.

According to an embodiment, in operation 1050, the image sensor 120 may photograph the subject in the MF HDR mode.

According to an embodiment, in operation 1055, an SF HDR mode condition event may occur, and the processor 220 may provide a mode switch signal to the image sensor 120.

According to an embodiment, in operation 1060, the image sensor 120 may photograph the subject in the SF HDR mode.

According to an embodiment, the processor 220 may switch the photographing mode of the image sensor 120, based on a change in the state (e.g., an unfolded state, a folded state, an extended state, or a reduced state) of the display 110 of the electronic device 100. For example, if the electronic device 100 is in a first state (e.g., a folded state or a reduced state), the processor 220 may switch the photographing mode to a first mode (e.g., the first mode in FIG. 3A), and if the electronic device 100 is in a second state (e.g., an unfolded state or an extended state), the processor 220 may switch the photographing mode to a second mode (e.g., the second mode in FIG. 3B). According to an embodiment, the processor 220 may perform the operations described in FIGS. 5A to 9 according to the mode (e.g., the first mode or the second mode) determined based on the state change of the display 110.

Table 1 indicates methods of the low-illuminance mode, normal mode, SF HDR mode, MF HDR mode, and MF/SF HDR mode (e.g., auto exposure bracketing (AEB)) in the electronic device 100.

TABLE 1

| | Low-illuminance mode | Normal mode | SF HDR mode | MF HDR mode | MF/SF HDR mode |
|---|---|---|---|---|---|
| Number of bits | 10 or 12 | 10 or 12 | 12 | 10 or 12 | 12 |
| Conversion gain | HCG | HCG or LCG | HCG or LCG | Long exposure: HCG Short exposure: LCG | Long exposure: HCG and LCG Short exposure: HCG and LCG |
| FPS | 30 | 30 to 120 | 60 | 60 to 120 | 60 to 120 |

Figure 11:
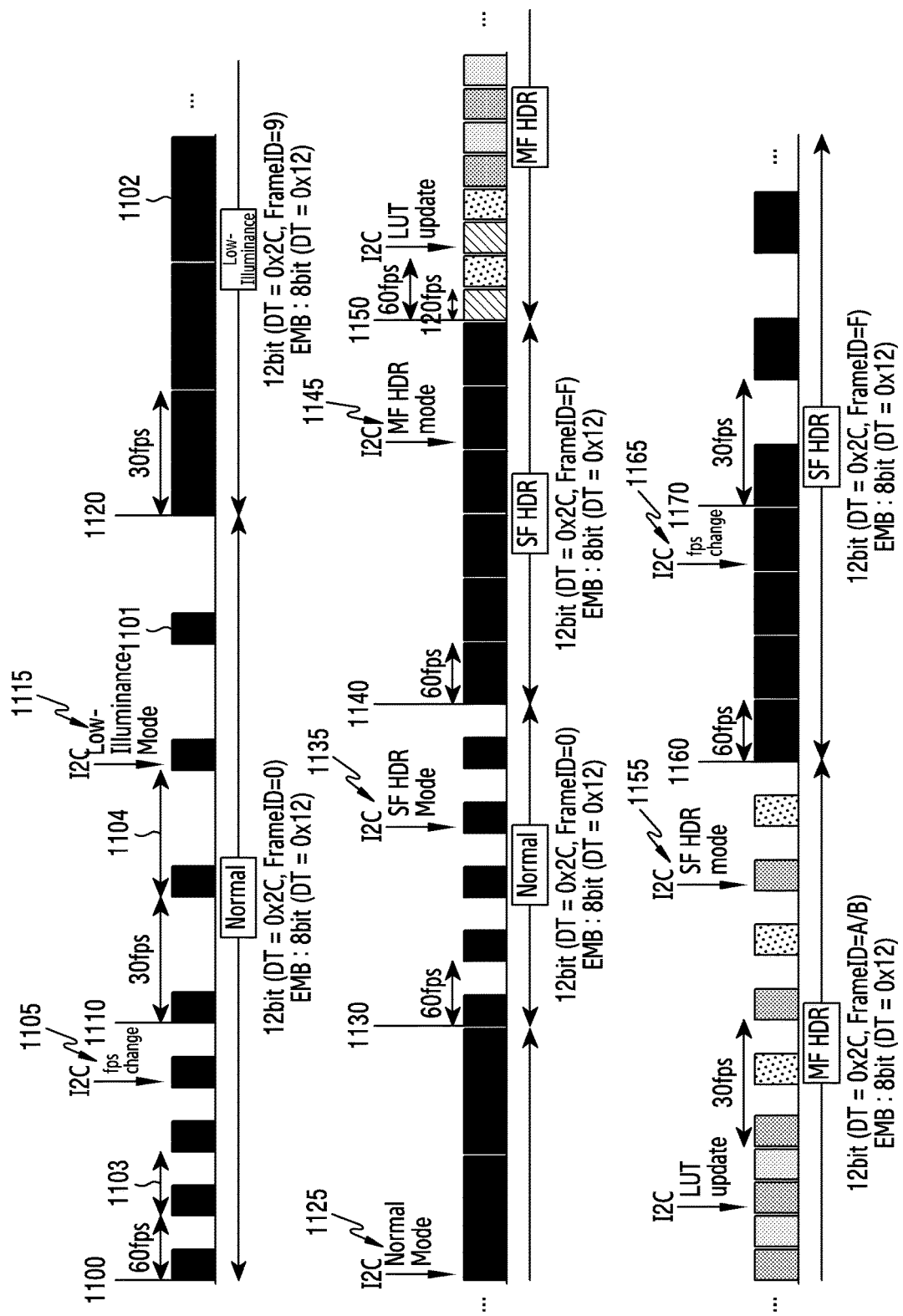
FIG. 11 illustrates an example of an output time of an image sensor according to switching of a photographing mode of an electronic device according to an embodiment.

FIG. 11 illustrates an example of an output time of an image sensor 120 according to switching of a photographing mode of an electronic device 100 according to an embodiment.

According to an embodiment, reference numerals 1101 and 1102 denote the time of outputting image data obtained by the image sensor 120 to the processor 220. Reference numeral 1101 denotes the output time of the image sensor 120 in the normal mode, and the reference numeral 1102 denotes the output time of the image sensor 120 in the low-illuminance mode. Since data input to the unit pixel 210 is read out two or more times in the low-illuminance mode, it may take a longer time for the image sensor 120 to output image data than in the normal mode. Accordingly, reference numeral 1102 may indicate a longer time than reference numeral 1101.

According to an embodiment, reference numerals 1103 and 1104 denote intervals between frames. Reference numeral 1103 denotes an interval between frames in the case of 60 fps, and reference numeral 1104 denotes an interval between frames in the case of 30 fps. The interval 1103 between frames in the case of photographing at 60 fps may be shorter than the interval 1104 between frames in the case of photographing at 30 fps.

According to an embodiment, the image sensor 120 may initiate photographing in the normal mode from the time denoted by reference numeral 1100. Reference numeral 1100 may correspond to operation 1010 in FIG. 10.

According to an embodiment, the image sensor 120 may output image data of 12 bits in the normal mode. The image sensor 120 may add dummy data of 2 bits to image data of 10 bits obtained by reading out data input to the unit pixel 210 at HCG or LCG and provide image data of 12 bits to the processor 220. In the case where the image sensor 120 outputs image data of 12 bits, the data type (DT) may correspond to 0x2C.

According to an embodiment, when the image sensor 120 performs photographing in the normal mode, Frame ID may be 0.

According to an embodiment, the image sensor 120 may output an embedded header (EMB) of 8 bits together with the image data of 12 bits. In the case where an embedded header of 8 bits is output together, DT may correspond to 0x12.

According to an embodiment, the processor 220 may provide the image sensor 120 with a signal instructing to change FPS (1105) through inter-integrated circuit (I2C) communication. The image sensor 120 may receive a FPS change signal from the processor 220 (1105) and change FPS from 60 fps to 30 fps from the time denoted by reference numeral 1110.

According to an embodiment, the processor 220 may determine that a low-illuminance mode condition event has occurred (e.g., operation 1015 in FIG. 10) and provide the image sensor 120 with a signal instructing to switch the mode to the low-illuminance mode (1115). The processor 220 may provide a mode switch signal to the image sensor 120 through I2C communication (1115).

According to an embodiment, the image sensor 120 may initiate photographing in the low-illuminance mode from the time denoted by reference numeral 1120. Reference numeral 1120 may correspond to operation 1020 in FIG. 10.

According to an embodiment, the image sensor 120 may output image data of 12 bits in the low-illuminance mode. The image sensor 120 may add dummy data of 2 bits to image data of 10 bits obtained by reading out data input to the unit pixel 210 at HCG two or more times and calculating an average value thereof, and provide image data of 12 bits to the processor 220. In the case where the image sensor 120 outputs image data of 12 bits, the data type (DT) may correspond to 0x2C.

According to an embodiment, when the image sensor 120 performs photographing in the low-illuminance mode, Frame ID may be 9.

According to an embodiment, the image sensor 120 may output an embedded header of 8 bits together with the image data of 12 bits. In the case where an embedded header of 8 bits is output together, DT may correspond to 0x12.

According to an embodiment, according to an embodiment, the processor 220 may determine that a normal mode condition event has occurred (e.g., operation 1025 in FIG. 10) and provide the image sensor 120 with a signal instructing to switch the mode to the normal mode (1125). The processor 220 may provide a mode switch signal to the image sensor 120 through the I2C communication (1125).

According to an embodiment, the image sensor 120 may initiate photographing in the normal mode from the time denoted by reference numeral 1130. Reference numeral 1130 may correspond to operation 1030 in FIG. 10.

According to an embodiment, the processor 220 may determine that an SF HDR mode condition event has occurred (e.g., operation 1035 in FIG. 10) and provide the image sensor 120 with a signal instructing to switch the mode to the SF HDR mode (1135). The processor 220 may provide a mode switch signal to the image sensor 120 through the I2C communication (1135).

According to an embodiment, the image sensor 120 may initiate photographing in the SF HDR mode from the time denoted by reference numeral 1140. Reference numeral 1140 may correspond to operation 1040 in FIG. 10.

According to an embodiment, the image sensor 120 may output image data of 12 bits in the SF HDR mode. The image sensor 120 may read out data input to the unit pixel 210 at HCG and then read the same at LCG, thereby obtaining image data of 12 bits. When the image sensor 120 outputs image data of 12 bits, the data type (DT) may correspond to 0x2C.

According to an embodiment, in the case where the image sensor 120 performs photographing in the SF HDR mode, Frame ID may be F.

According to an embodiment, the image sensor 120 may output an embedded header of 8 bits together with image data of 12 bits. When the embedded header of 8 bits is output together, DT may correspond to 0x12.

According to an embodiment, the processor 220 may determine that an MF HDR mode condition event has occurred (e.g., operation 1045 in FIG. 10) and provide the image sensor 120 with a signal instructing to switch the mode to an MF HDR mode (1145). The processor 220 may provide a mode switch signal to the image sensor 120 through the I2C communication (1145).

According to an embodiment, the image sensor 120 may initiate photographing in the MF HDR mode from the time denoted by reference numeral 1150. Reference numeral 1150 may correspond to operation 1050 in FIG. 10. In the MF HDR mode, the image sensor 120 may photograph an image corresponding to long exposure at 60 fps and photograph an image corresponding to short exposure at 120 fps.

According to an embodiment, the image sensor 120 may output image data of 12 bits in the MF HDR mode. The image sensor 120 may add dummy data of 2 bits to image data of 10 bits obtained by reading out data (hereinafter, long-exposure data), which is input to the unit pixel 210 during a first exposure time, at HCG to obtain image data of 12 bits and add dummy data of 2 bits to image data of 10 bits obtained by reading out data (hereinafter, short-exposure data), which is input to the unit pixel 210 during a second exposure time, at LCG to obtain image data of 12 bits. In the case where the image sensor 120 outputs image data of 12 bits, the data type (DT) may correspond to 0x2C.

According to an embodiment, the image sensor 120 may perform photographing in the MF/SF HDR mode, instead of in the MF HDR mode. In the MF/SF HDR mode, long-exposure data may be read out at HCG and LCG, and short-exposure data may also be read out at HCG and LCG, thereby obtaining image data of 12 bits, respectively.

According to an embodiment, in the case where the image sensor 120 performs photographing in the MF HDR mode, Frame ID may be A and B. Frame ID of image data obtained by reading out long-exposure data by the image sensor 120 may be A, and Frame ID of image data obtained by reading out short-exposure data by the same may be B. In MF HDR mode, Frame ID may repeat as "ABABABAB".

According to an embodiment, the image sensor 120 may output an embedded header of 8 bits together with the image data of 12 bits. In the case where an embedded header of 8 bits is output together, DT may correspond to 0x12.

According to an embodiment, the processor 220 may provide a signal instructing to update a look-up table (LUT) through the I2C communication. In an embodiment, the image sensor 120 may receive an LUT update signal and output updated image data. In another embodiment, the image sensor 120 may change FPS to correspond to the received LUT update signal. For example, if the image sensor 120 outputting image data at 60 fps and 120 fps, respectively, obtains the LUT update signal, it may output long-exposure data and short-exposure data at 30 fps, respectively.

According to an embodiment, the processor 220 may determine that an SF HDR mode condition event has occurred (e.g., operation 1055 in FIG. 10) and provide the image sensor 120 with a signal instructing to switch the mode to the SF HDR mode (1155). The processor 220 may provide a mode switch signal to the image sensor 120 through the I2C communication (1155).

According to an embodiment, the image sensor 120 may initiate photographing in the SF HDR mode from the time denoted by reference numeral 1160. Reference numeral 1160 may correspond to operation 1060 in FIG. 10.

According to an embodiment, the processor 220 may provide the image sensor 120 with a signal instructing to change FPS through the I2C communication (1165). The image sensor 120 may receive an FPS switch signal from the processor 220 (1165) and change FPS from 60 fps to 30 fps from the time denoted by reference numeral 1170.

According to an embodiment, in order for the processor 220 (or AP) to efficiently perform the process of processing image data provided from the image sensor 120, the image sensor 120 may transfer information about sensor output data in addition to the image data. The information about sensor output data may include at least one of a DT for the number of bits of image data, a DT for the number of bits of an embedded header, and a Frame ID according to each photographing mode. In addition, the information about sensor output data may be based on the mobile industry processor interface (MIPI) standard. The image sensor 120 may transmit phase difference auto focus (PDAF) information together with the image data.

According to an embodiment, the image sensor 120 may output image data having a constant number of bits even if the photographing mode switches. For example, even if the photographing mode switches from the normal mode to the low-illuminance mode, the SF HDR mode, the MF HDR mode, or the MF/SF HDR mode, the image sensor 120 may provide image data having 12 bits to the processor 220. Since the processor 220 receives image data having a constant number of bits from the image sensor 120, it may process the image data without changing the configuration state of the processor 220. Even if a photographing mode condition switch event occurs while the user is photographing a subject using the electronic device 100, the number of bits of image data output from the image sensor 120 may be maintained constant, so that the electronic device 100 may display a seamless preview on the display 110.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thererto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292

(e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 13 is a block diagram 1300 illustrating the camera module 1280 according to various embodiments. Referring to FIG. 13, the camera module 1280 may include a lens assembly 1310, a flash 1320, an image sensor 1330, an image stabilizer 1340, memory 1350 (e.g., buffer memory), or an image signal processor 1360. The lens assembly 1310 may collect light emitted or reflected from an object whose image is to be taken. The lens assembly 1310 may include one or more lenses. According to an embodiment, the camera module 1280 may include a plurality of lens assemblies 1310. In such a case, the camera module 1280 may form, for example, a dual camera, a 360-degree camera, or a spherical camera. Some of the plurality of lens assemblies 1310 may have the same lens attribute (e.g., view angle, focal length, auto-focusing, f number, or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment, the image sensor 1330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1280 or the electronic device 1201 including the camera module 1280. This allows compensating for at least part of a negative effect (e.g., image blurring) by the movement on an image being captured. According to an embodiment, the image stabilizer 1340 may sense such a movement by the camera module 1280 or the electronic device 1201 using a gyro sensor (not shown) or an acceleration sensor (not shown) disposed inside or outside the camera module 1280. According to an embodiment, the image stabilizer 1340 may be implemented, for example, as an optical image stabilizer. The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display device 1260. Thereafter, if a specified condition is met (e.g., by a user's input or system command), at least part of the raw image stored in the memory 1350 may be obtained and processed, for example, by the image signal processor 1360. According to an embodiment, the memory 1350 may be configured as at least part of the memory 1230 or as a separate memory that is operated independently from the memory 1230.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1280. An image processed by the image signal processor 1360 may be stored back in the memory 1350 for further processing, or may be provided to an external component (e.g., the memory 1230, the display device 1260, the electronic device 1202, the electronic device 1204, or the server 1208) outside the camera module 1280. According to an embodiment, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1220, via the display device 1260 as it is or after being further processed.

According to an embodiment, the electronic device 1201 may include a plurality of camera modules 1280 having different attributes or functions. In such a case, at least one of the plurality of camera modules 1280 may form, for example, a wide-angle camera and at least another of the plurality of camera modules 1280 may form a telephoto camera. Similarly, at least one of the plurality of camera modules 1280 may form, for example, a front camera and at least another of the plurality of camera modules 1280 may form a rear camera.

An electronic device according to an embodiment of the present disclosure may include an image sensor and at least one processor. The image sensor may provide the at least one processor, in a first mode, with first image data having a first number of bits and obtained by reading out data input to a unit pixel of the image sensor at a first conversion gain and provide the at least one processor, in a second mode, with second image data having a second number of bits, which is larger than the first number, and obtained by reading out data input to the unit pixel of the image sensor at the first conversion gain and a second conversion gain lower than the first conversion gain.

In an electronic device according to an embodiment of the present disclosure, the first mode may be a low-illuminance mode, and the image sensor may obtain the first image data in the first mode by reading out data input to the unit pixel of the image sensor two or more times at the first conversion gain and calculating an average value thereof.

In an electronic device according to an embodiment of the present disclosure, the first mode may be a normal mode, and the image sensor may obtain the first image data by reading out data input to the unit pixel of the image sensor at the first conversion gain or reading out the same at the second conversion gain in the first mode.

In an electronic device according to an embodiment of the present disclosure, the image sensor may provide the at least one processor, in the first mode, with third image data having the second number of bits and obtained by adding dummy data having a third number of bits to the first image data having the first number of bits.

In an electronic device according to an embodiment of the present disclosure, the first number may be 10, the third number may be 2, and the second number may be 12.

In an electronic device according to an embodiment of the present disclosure, the image sensor may provide the at least one processor, in the first mode, with the first image data having the first number of bits and obtained by reading out data input to the unit pixel of the image sensor during a first exposure time at the first conversion gain and fourth image data having the first number of bits and obtained by reading out data input to the unit pixel of the image sensor during a second exposure time at the second conversion gain.

In an electronic device according to an embodiment of the present disclosure, the first mode may be a multi-frame high-dynamic range (MF HDR) mode, and the first exposure time may be greater than the second exposure time.

In an electronic device according to an embodiment of the present disclosure, the image sensor may provide the at least one processor, in the first mode, with third image data having the second number of bits and obtained by adding dummy data having a third number of bits to the first image data having the first number and fifth image data having the second number of bits and obtained by adding dummy data having the third number of bits to the fourth image data having the first number.

In an electronic device according to an embodiment of the present disclosure, the image sensor may provide the at least one processor, in the second mode, with second image data having the second number of bits and obtained by reading out data input to the unit pixel of the image sensor during a first exposure time at the first conversion gain and the second conversion gain, and sixth image data having the second number of bits and obtained by reading out data input to the unit pixel of the image sensor during a second exposure time at the first conversion gain and the second conversion gain.

In an electronic device according to an embodiment of the present disclosure, the image sensor may add an embedded header to the first image data and the second image data, and provide the same to the at least one processor.

In an electronic device according to an embodiment of the present disclosure, the embedded header may include information about the number of bits of image data output by the image sensor.

In an electronic device according to an embodiment of the present disclosure, the embedded header may include information about a type of conversion gain at which the data input to the unit pixel of the image sensor is read out.

A method of operating an electronic device according to an embodiment of the present disclosure may include, by an image sensor included in the electronic device, obtaining first image data having a first number of bits by reading out data input to a unit pixel of the image sensor at a first conversion gain in a first mode, obtaining second image data having a second number of bits larger than the first number by reading out data input to the unit pixel of the image sensor at the first conversion gain and a second conversion gain, which is lower than the first conversion gain, in a second mode, and providing the first image data and the second image data to at least one processor included in the electronic device.

A method of operating an electronic device according to an embodiment of the present disclosure may include, by the image sensor, in the first mode, obtaining third image data having the second number of bits by adding dummy data having a third number of bits to the first image data having the first number of bits and providing the third image data to the at least one processor.

A method of operating an electronic device according to an embodiment of the present disclosure may include, by the image sensor, in the second mode, obtaining second image data having the second number of bits by reading out data input to the unit pixel of the image sensor during a first exposure time at the first conversion gain and the second conversion gain, obtaining sixth image data having the second number of bits by reading out data input to the unit pixel of the image sensor during a second exposure time at the first conversion gain and the second conversion gain, and providing the second image data and the sixth image data to the at least one processor.

An electronic device according to an embodiment of the present disclosure may include an image sensor and at least one processor electrically connected to the image sensor. The image sensor may provide the at least one processor with image data obtained by reading out data input to a unit pixel of the image sensor at a first conversion gain and a second conversion gain lower than the first conversion gain.

In an electronic device according to an embodiment of the present disclosure, the image sensor may include a structure for reading out data input to a unit pixel of the image sensor through one-time exposure at a first conversion gain and a second conversion gain.

In an electronic device according to an embodiment of the present disclosure, the image sensor may provide the at least one processor with image data obtained by reading out data input to the unit pixel of the image sensor during a first exposure time at the first conversion gain and the second conversion gain, and image data obtained by reading out data input to the unit pixel of the image sensor during a second exposure time at the first conversion gain and the second conversion gain.

In an electronic device according to an embodiment of the present disclosure, the image sensor may add an embedded header to the image data and provide the same to the at least one processor.

In an electronic device according to an embodiment of the present disclosure, the embedded header may include information about a type of conversion gain at which the data input to the unit pixel of the image sensor is read out.

What is claimed is:

1. An electronic device comprising:
an image sensor; and
at least one processor electrically connected to the image sensor,
wherein the image sensor is configured to:
activate a first mode or a second mode based on at least one of a change in illumination, subject movement, or a user setting;
provide first image data having a first number of bits to the at least one processor, wherein the image sensor is in the first mode, and wherein the first image data is obtained by outputting data input to a unit pixel of the image sensor at a first conversion gain; and
provide second image data having a second number of bits to the at least one processor, wherein the image sensor is in a single-frame high-dynamic range mode of the second mode, wherein the second mode comprises the single-frame high-dynamic range mode or multi-frame/single-frame high-dynamic range mode, wherein the second number of bits is larger than the first number of bits, and wherein the second image data is obtained by outputting the data input to the unit pixel of the image sensor at the first conversion gain and a second conversion gain lower than the first conversion gain,
wherein the image sensor is further configured to add an embedded header to the first image data and the second image data and provide the embedded header to the at least one processor,
wherein the embedded header comprises information about a number of bits of image data output by the image sensor.

2. The electronic device of claim 1, wherein the first mode is a low-illuminance mode, and
wherein the image sensor is further configured, in the first mode, to obtain the first image data by outputting the data input to the unit pixel of the image sensor two or more times at the first conversion gain and calculating an average conversion gain.

3. The electronic device of claim 1, wherein the first mode is a normal mode, and
wherein the image sensor is further configured to, in the first mode, obtain the first image data by outputting the data input to the unit pixel of the image sensor at the first conversion gain or outputting the data input to the unit pixel of the image sensor at the second conversion gain.

4. The electronic device of claim 1, wherein the image sensor is further configured to provide the at least one processor, in the first mode, with third image data having the second number of bits, wherein the third image data is obtained by adding dummy data having a third number of bits to the first image data having the first number of bits.

5. The electronic device of claim 4, wherein the first number of bits is 10, the second number of bits is 12, and the third number of bits is 2.

6. The electronic device of claim 1, wherein the image sensor is further configured to provide the at least one processor, in the first mode, with the first image data having the first number of bits and fourth image data having the first number of bits, wherein the first image data is obtained by outputting the data input to the unit pixel of the image sensor during a first exposure time at the first conversion gain, and wherein the fourth image data is obtained by outputting the data input to the unit pixel of the image sensor during a second exposure time at the second conversion gain.

7. The electronic device of claim 6, wherein the first mode is a multi-frame high-dynamic range (MF HDR) mode, and wherein the first exposure time is greater than the second exposure time.

8. The electronic device of claim 6, wherein the image sensor is further configured to provide the at least one processor, in the first mode, with third image data having the second number of bits and fifth image data having the second number of bits, wherein the third image data is obtained by adding dummy data having a third number of bits to the first image data, and wherein the fifth image data is obtained by adding the dummy data having the third number of bits to the fourth image data.

9. The electronic device of claim 1, wherein the image sensor is further configured to provide the at least one processor, in the second mode, with the second image data having the second number of bits and sixth image data having the second number of bits, wherein the second image data is obtained by outputting the data input to the unit pixel of the image sensor during a first exposure time at the first conversion gain and the second conversion gain, and wherein the sixth image data is obtained by outputting the data input to the unit pixel of the image sensor during a second exposure time at the first conversion gain and the second conversion gain.

10. The electronic device of claim 1, wherein the embedded header comprises information about a type of conversion gain at which the data input to the unit pixel of the image sensor is output.

11. A method of operating an electronic device, the method being performed by an image sensor included in the electronic device, the method including:
    activating a first mode or a second mode base dion at least one of change in illumination, subject movement, or a user setting:
    obtaining, when the image sensor is in the first mode, first image data having a first number of bits by outputting data input to a unit pixel of the image sensor at a first conversion gain;
    obtaining, when the image sensor is in a single-frame high-dynamic range mode of the second mode, wherein the second mode comprises the single-frame high-dynamic range mode or multi-frame/single-frame high-dynamic range mode, second image data having a second number of bits by outputting the data input to the unit pixel of the image sensor at the first conversion gain and a second conversion gain, the second number of bits being larger than the first number of bits, and the second conversion gain is lower than the first conversion gain; and
    adding an embedded header to the first image data and the second image data and providing the first image data and the second image data to at least one processor included in the electronic device,
    wherein the embedded header comprises information about a number of bits of image data output by the image sensor.

12. The method of claim 11, wherein the image sensor is in the first mode, and the method further comprises:
    obtaining, by the image sensor, third image data having the second number of bits by adding dummy data having a third number of bits to the first image data having the first number of bits; and
    providing, by the image sensor, the third image data to the at least one processor.

13. The method of claim 11, wherein the image sensor is in the second mode, and the method further comprises:
    obtaining, by the image sensor, the second image data having the second number of bits by outputting the data input to the unit pixel of the image sensor during a first exposure time at the first conversion gain and the second conversion gain;
    obtaining, by the image sensor, sixth image data having the second number of bits by outputting the data input to the unit pixel of the image sensor during a second exposure time at the first conversion gain and the second conversion gain; and
    providing, by the image sensor, the second image data and the sixth image data to the at least one processor.

14. An electronic device comprising:
    an image sensor; and
    at least one processor electrically connected to the image sensor,
    wherein the image sensor is configured to:
        provide the at least one processor with image data obtained by reading out data input to a unit pixel of the image sensor at a first conversion gain and a second conversion gain lower than the first conversion gain, and
        activate a first mode or a second mode based on at least one of a change in illumination, subject movement, or a user setting,
        wherein the image data comprises:
            first image data when the image sensor is in the first mode, with the first image data being obtained by outputting data input to the unit pixel of the image sensor at the first conversion gain, and
            second image data based on the image sensor changing from the first mode to the second mode, with the second image data being obtained by outputting the data input to the unit pixel of the image sensor at the first conversion gain when a dynamic range gate of the unit pixel is in an off state and by outputting the data input to the unit pixel of the image sensor at the second conversion gain lower than the first conversion gain when the dynamic range gate of the unit pixel is in an on state,
    wherein the image sensor is further configured to add an embedded header to the first image data and the second image data and provide the embedded header to the at least one processor,
    wherein the embedded header comprises information about a number of bits of image data output by the image sensor.

15. The electronic device of claim 14, wherein the image sensor further comprises a structure for reading out the data input to the unit pixel of the image sensor through one-time exposure at the first conversion gain and the second conversion gain.

16. The electronic device of claim 14, wherein the image sensor is further configured to provide the at least one processor with image data obtained by reading out the data input to the unit pixel of the image sensor during a first exposure time at the first conversion gain and the second conversion gain, and image data obtained by reading out the data input to the unit pixel of the image sensor during a second exposure time at the first conversion gain and the second conversion gain.

* * * * *